US008173765B2

(12) United States Patent
Zhu et al.

(10) Patent No.: US 8,173,765 B2
(45) Date of Patent: May 8, 2012

(54) POLYMERS, USES AND METHODS OF MANUFACTURE THEREOF

(75) Inventors: Xiao-Xia Zhu, Dollard-des-Ormeaux (CA); Julien Gautrot, Cambridge (GB); Jie Zhang, Montreal (CA); Yu Shao, Tianshui (CN)

(73) Assignee: Valorisation-Recherche, Limited Partnership, Montreal (CA)

( * ) Notice: Subject to any disclaimer, the term of this patent is extended or adjusted under 35 U.S.C. 154(b) by 307 days.

(21) Appl. No.: 12/182,538

(22) Filed: Jul. 30, 2008

(65) Prior Publication Data

US 2009/0082542 A1 Mar. 26, 2009

Related U.S. Application Data

(60) Provisional application No. 60/952,702, filed on Jul. 30, 2007.

(51) Int. Cl.
*C08G 63/02* (2006.01)

(52) U.S. Cl. ........ 528/298; 528/272; 528/280; 528/307; 424/78.08; 424/78.21; 424/78.23; 424/78.3; 424/78.31; 424/78.32; 424/78.37; 424/422; 424/423; 424/426

(58) Field of Classification Search ................... 528/271, 528/272, 280, 288, 289, 292, 295.3, 298, 528/300, 302, 303, 307, 310, 324, 330, 332, 528/346, 367, 369; 424/78.08, 78.21, 78.23, 424/78.3, 78.31, 78.32, 78.37, 411, 419, 424/423, 426

See application file for complete search history.

(56) References Cited

U.S. PATENT DOCUMENTS 3,907,926 A * 9/1975 Brown et al. .................. 524/258
5,955,068 A * 9/1999 Gouin et al. ................ 424/78.17
6,160,084 A 12/2000 Langer et al.
2007/0004866 A1* 1/2007 Schorzman et al. ....... 525/326.2

OTHER PUBLICATIONS

Julien E. Gautrot, X.X. Zhu, Molar mass of main-chain bile acid-based oligo-esters measured by SEC, MALDI-TOF spectrometry and NMR spectroscopy: A comparative study, Analytica Chimica Acta, vol. 581, Issue 2, Jan. 9, 2007, pp. 281-286.*
Amsden et al. "Synthesis and Characterization of a Photo-Cross-Linked Biodegradable Elastomer", Biomacromolecules, 5:2479-2486, 2004 (on web Sep. 25, 2004).
Chen et al., "Modeling Ring-Chain Equilibria in Ring-Opening Polymerization of Cycloolefins", Macromolecules, 28:2147-2154, 1995.
Cohn et al., "Designing biodegradable multiblock PCL/PLA thermoplastic elastomers", Biomaterials, 26:2297-2305, 2005 (on web Sep. 22, 2004).

(Continued)

*Primary Examiner* — James J Seidleck
*Assistant Examiner* — Frances Tischler
(74) *Attorney, Agent, or Firm* — Goudreau Gage Dubuc; Alain M. Leclerc; Isabelle Pelletier

(57) ABSTRACT

A polymer having a number average molecular weight (Mn) of about 10 000 g/mol comprising a monomeric rigid moiety R and a monomeric flexible moiety F, wherein R comprises a main-chain polycyclic core and F has a main chain comprising a number of atoms sufficient for the transition temperature of the polymer to be lower than the degradation temperature of the polymer is provided. A method of manufacturing of same is also provided. Biomedical devices, scaffolds and supports for tissue engineering, delivery devices, textiles, moulds, vehicle parts, tubes, active disassembly devices, microactuators, toys and inflatable membranes comprising same are also described.

46 Claims, 17 Drawing Sheets

OTHER PUBLICATIONS

Fu et al., "Visual Evidence of Acidic Environment Within Degrading Poly (lactic-co-glycolic acid) PLGA Microspheres", Pharm. Res. 17:100-106, 2000.

Gosline et al., "Elastic proteins: biological roles and mechanical properties", Philos. Trans R Soc. London B, 357:121-132, 2002 (on Web Feb. 28, 2002).

Gouin et al., "New Polyanhydrides Made from a Bile Acid Dimer and Sebacic Acid: Synthesis, Characterization and Degradation", Macromolecules 33:5379, 2000 (on Web Jun. 28, 2000).

Hodge et al. "Recent work on entropically-driven ring-opening polymerizations: some potential applications", Polym. Adv. Technol 16:84-94, 2005 (on Web Jan. 7, 2005).

Hodge et al., "Entropically Driven Ring-Opening-Metathesis Polymerization of Macrocyclic Olefins with 21-84 Ring Atoms" Angew Chem. Int. Ed. 42:2412-2414, 2003.

Hodge et al., "Entropically Driven Ring-Opening-Metathesis Polymerization of Macrocyclic Olefins with 21-84 Ring Atoms", Angew. Chem. 115:2514-2516, 2003.

Hofmann et al., "Physicochemical properties of bile acids and their relationship to biological properties: an overview of the problem", J. Lipid Res. 25:1477-1489, 1984.

Hu et al., "Selective acylation of cholic acid derivatives with multiple methacrylate groups", Steroids 70:531-537, 2005 (on Web Mar. 25, 2005).

Jacobson et al., "Intramolecular Reaction in Polycondensations. I. The Theory of Linear Systems", Chem. Phys.18:1600-1606, 1950.

Janout et al.,"Molecular Umbrella-Assisted Transport of an Hydrophilic Peptide Across a Phospholipid Membrane", J. Am. Chem. Soc.122:2671-2672, 2000 (on Web Mar. 2, 2000).

Janout et al., "A Needle-and-Thread Approach to Bilayer Transport: Permeation of a Molecular Umbrella-Oligonucleotide . . . ", J. Am. Chem. Soc. 127:22-23, 2005 (on Web Dec. 9, 2004).

Kamau et al., "Cyclo-depolymerization of Poly(propylene terephthalate): Some ring-opening Polymerizations of the Cyclic Oligomers . . . ", Polym. Adv. Technol 14:492-501, 2003.

Lendlein et al., "Biodegradable, Elastic Shape-Memory Polymers for Potential Biomedical Applications", Science 296:1673-1676, 2002 (on Web Apr. 25, 2002).

Love et al., "A Practical and Highly Active Ruthenium-Based Catalyst that Effects the Cross Metathesis of Acrylonitrile", Angew. Chem. Int. Ed. 41:4035-4037, 2002.

Nomura et al., "Anionic Ring-Opening Polymerization of Macrocyclic Esters", Macromolecules 27:620-621, 1994.

Park et al., Biomaterials: An Introduction, 2nd ed. (Plenum: New York) 1992, pp. 1-6.

Semlyen, "Ring-Chain Equilibria and the Conformations of Polymer Chains", Adv. Polym. Sci., vol. 21 (Springer: Berlin/Heidelberg) pp. 41-75, 1976.

Tripathy et al., "In-Situ Copolymerization of Cyclic Poly(butylene terephthalate) Oligomers and ε-Caprolactone", Macromolecules 37:6793-6800, 2004 (on Web Aug. 13, 2004).

Trnka et al., "Synthesis and Activity of Ruthenium Alkylidene Complexes Coordinated with Phosphine . . . ", J. Am. Chem. Soc. 125:2546-2558, 2003 (on Web Feb. 12, 2003).

Virtanen et al., "Use of Bile Acids in Pharmacological and Supramolecular Applications", Eur. J. Org. Chem. 3385-3399, 2004.

Wang et al., "A tough biodegradable elastomer", Nat. Biotechnol. 20:602-606, 2002.

Younes et al., "Synthesis, characterization and in vitro degradation of a biodegradable elastomer", Biomaterials 25:5261-5269, 2004.

\* cited by examiner $$A_1 c_1 \left(T_g - T_{g1}\right) + A_2 c_2 \left(T_g - T_{g2}\right) = 0$$

if $A_1 M_1 = A_2 M_2$, then:

$$T_g = T_{g2} + \left(T_{g1} - T_{g2}\right) n_1$$

| 2 theta (°) | 2.425 | 4.891 | 7.345 |
|---|---|---|---|
| d (Å) | 36.4 | 18.1 | 12.0 |

Aggregate (2 theta = 2.741, d = 32.2 Å )

POLYMERS, USES AND METHODS OF MANUFACTURE THEREOF

CROSS REFERENCE TO RELATED APPLICATIONS

This application claims priority, under 35 U.S.C. §119(e), of U.S. provisional application Ser. No. 60/952,702, filed on Jul. 30, 2007. All documents above are incorporated herein in their entirety by reference.

FIELD OF THE INVENTION

The present invention relates to novel polymers. More specifically, the present invention is concerned with novel polymers, their method of manufacture and their uses in many applications.

BACKGROUND OF THE INVENTION

Despite the tremendous progress made in the field of biomedical engineering, many challenges still remain to be addressed—especially in the design of new materials. The biodegradable synthetic polymers currently used for biomedical applications are almost exclusively based on short aliphatic moieties, such as lactides, glycolides, $\epsilon$-caprolactone, and sebacic acid, which all display relatively "hard" mechanical properties that adjust poorly to those of tissues, and therefore cause considerable stress mismatches at the inter-face responsible for necrosis or abnormal regeneration. [Wang et al., *Nat. Biotechnol.* 2002, 20, 602-606; Lendlein et al., *Science* 2002, 296, 1673-1676; and Park et al., *Biomaterials: An Introduction,* 2nd ed., Plenum, New York, 1992, pp. 1-6.]

In fact, most synthetic degradable biomaterials are based on aliphatic polyesters such as polylactides, polyglycolides and poly($\epsilon$-caprolactone). These materials can advantageously be functionalized or modified in order to be used in many biomedical applications. However, their mechanical properties are often inadequate for tissue engineering, especially that of soft tissues. For biomedical engineering, more precisely soft tissue engineering, it is indeed desirable to use materials with Young moduli matching those of the surrounding tissues.

In some cases, simple elasticity and suitable Young modulus are sufficient to allow soft tissue engineering. However, in other cases, more complex and smarter devices are required. Smart devices should enable an action of biological importance to be accomplished remotely in the body. The triggering stimulus could conveniently be the temperature and for many applications, the desired action is a change in shape. Shape memory is therefore a highly desirable characteristic for degradable materials aimed at biomedical applications.

Shape memory materials are materials that can be deformed, are capable to retain this deformed shape in some conditions and can then recover their original shape under an external stimulus such as the temperature. FIG. 1 shows a schematic representation of shape memory effect. In step 1, a deformation is applied to the object either by torsion, elongation, compression or any combination of these actions. The temporary shape of the object is retained either by quenching at low temperature or simply leaving the object below its transition temperature. In step 2, the permanent shape of the object is recovered by heating it above its transition temperature.

Typical known shape memory materials can be subdivided into two main classes: alloys, such as nitinol, and polymers, such as polyurethanes. Nitinol and various polyurethane shape memory polymers have been used for many applications ranging from inflatable reflectors for the aerospatial field to stents and stent-grafts.

Shape memory materials, whether alloys or polymers, have also been used in biomedical applications for a long time. Until very recently however, shape memory materials were non degradable. For biomedical applications, such materials stay in the body until they are removed during surgery. In many cases, it would be more advantageous and less invasive to use degradable shape memory polymers that do not require surgery to remove the implant.

Up to now, very few degradable shape memory materials have been developed and they are just starting to be used in biomedical studies. However, biomedical requirements, such as tunable transition temperature, Young modulus and hydrophilicity as well as an amorphous and thermoplastic nature and a controlled degradability are still not fully met in degradable shape memory materials developed so far.

For example, Lendlein and Langer developed degradable shape memory polymers a few years ago (U.S. Pat. No. 6,160, 084). These materials are either thermosets or thermoplastic block copolymers. Thermosets are difficult to process and thermoplastics can display less heterogeneous degradation profiles as well as dramatic loss of mechanical properties upon degradation. Furthermore, it is still relatively difficult to control critical parameters such as the transition temperature, the Young modulus of the material or its hydrophilicity.

Some materials based on bile acids for drug delivery [Janout et al., *J. Am. Chem. Soc.* 2005, 127, 22-23; Janout et al., *J. Am. Chem. Soc.* 2000, 122, 2671-2672; and Virtanen et al., *Eur. I. Org. Chem.* 2004, 3385-3399] and controlled release [Gouin et al., *Macromolecules* 2000, 33, 5379] applications are known. However, reports on main-chain bile acid based polyesters, polyamides, and polyurethanes are still scarce in the literature, and their synthesis constitutes a real challenge, especially when higher molecular weights are required. However, up to now, the synthesis of such materials required using large amounts of coupling agents for the polycondensation reactions, which increased the toxicity of these materials.

The present description refers to a number of documents, the content of which is herein incorporated by reference in their entirety.

SUMMARY OF THE INVENTION

In accordance with the present invention, there is provided a polymer having a number average molecular weight (Mn) of about 10 000 g/mol or more comprising a monomeric rigid moiety R and a monomeric flexible moiety F, wherein R comprises a main-chain polycyclic core and F has a main chain comprising a number of atoms sufficient for the transition temperature of the polymer to be lower than the degradation temperature of the polymer.

In embodiments, the polymer may be a homopolymer, an alternating copolymer, a periodic copolymer, a random copolymer, a statistical copolymer or a block copolymer.

In embodiments, the polycyclic core may comprise at least three cycles.

In embodiments, the cycles may be 5- or 6-membered carbon-based cycles.

In embodiments, the cycles may be aliphatic.

In embodiments, R may comprise a steroidal moiety.

In embodiments, the polycyclic core may comprise at least four cycles.

In embodiments, the cycles may be fused.

In embodiments, the main chain may comprise at least 12 atoms.

In embodiments, the main chain may be carbon-based and may be linear, branched, cyclic or a combination thereof.

In embodiments, the main chain may be acyclic.

In embodiments, the main chain may comprise one or more ester, amide, anhydride, urethane, urea, imide, imine, diazene, alkene, alkyne, ketone, sulfone, thioether, thioester, or fluoroalkane group, In embodiments, the main chain may be substituted by one or more of alkyl, aryl, fluoroalkyl, alkoxyl, hydroxyl, amine, nitrile, imine, ketone, aldehyde, carboxylic acid, carboxylate, ester, amide, imide, urethane, urea, anhydride, thiol, sulfonic acid, sulfonate, sulfonyle, bromide, chloride, iodide, azide, thioester, alkene, alkyne, ether, thioether, thioester, phosphoric acid, phosphorate or phosphine.

In embodiments, R may be of formula:

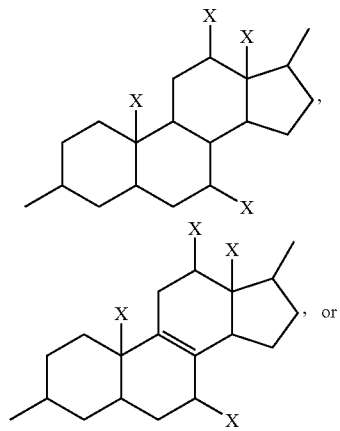

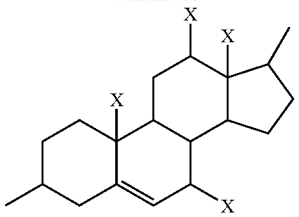

wherein X is the same or different and represents hydrogen, alkyl, aryl, fluoroalkyl, alkoxyl, hydroxyl, amine, nitrile, imine, ketone, aldehyde, carboxylic acid, carboxylate, ester, amide, imide, urethane, urea, anhydride, thiol, sulfonic acid, sulfonate, sulfonyle, bromide, chloride, iodide, azide, thioester, alkene, alkyne, ether, thioether, thioester, phosphoric acid, phosphorate or phosphine.

In embodiments, R may be a polycyclic core of a bile acid.

In embodiments, R may be of formula:

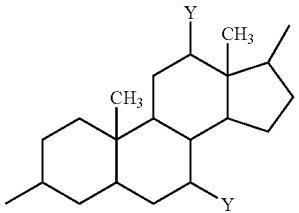

wherein Y is H or OH.

In embodiments, R may also be a dimer of steroidal moieties. More specifically, R may be:

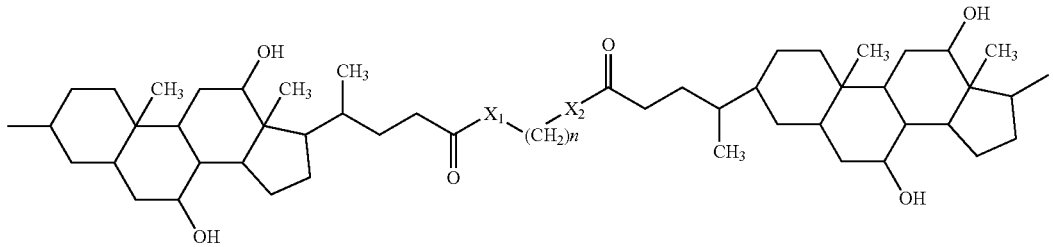

wherein $X_1$ and $X_2$ independently may be O or NH and n may be between 2 and 12.

In embodiments, the main chain may comprise between about 26 and about 29 atoms.

In embodiments, F may be of formula:

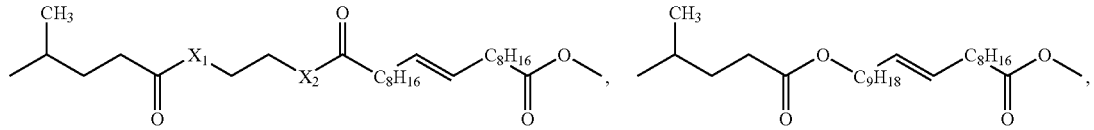

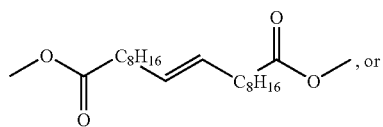

-continued

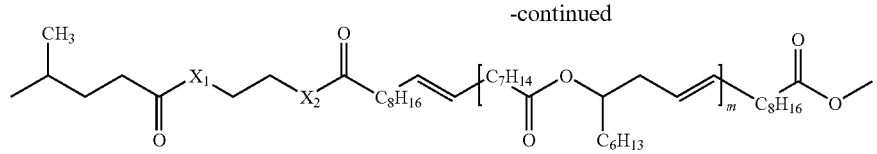

wherein $X_1$ and $X_2$ independently may be O or NH and m may be at least one.

In embodiments, the polymer may have a glass transition ($T_g$) between about −75 and about 200° C., between about −55 and about 120° C. or between about −25 and about 70° C.

In embodiments, the polymer may have a number average molecular weight ($M_n$) of about 30 000 g/mol or more, or about 100 000 g/mol or more.

The present invention also relates to a biomedical device comprising the above polymer. In embodiments, the device may be a stent, a stent-graph, or a suture.

The present invention also relates to a scaffold or a support for tissue engineering, the scaffold or support comprising the above polymer.

The present invention also relates to a delivery device for the controlled release of an active ingredient, the device comprising the above polymer. In embodiments, the device may be an implant, a patch, a liquid pharmaceutical composition or a solid pharmaceutical composition.

The present invention also relates to a textile, a mould, a vehicle part, a tube, an active disassembly device, a microactuator, a toy and an inflatable membrane, all of them comprising the above polymer.

The present invention also relates to a biomedical device comprising the above polymer. The biomedical device may be a stent, a stent-graph, a suture, a scaffold or a support for tissue engineering, or a delivery device for the controlled release of an active ingredient. This delivery device may be an implant, a patch, a liquid pharmaceutical composition or a solid pharmaceutical composition.

The present invention also relates to a device comprising the above polymer. This device may be a textile, a mould, a vehicle part, a tube, an active disassembly device, a microactuator, a toy or an inflatable membrane.

The present invention also relates to a method of manufacturing a polymer, the method comprising: (A) providing (i) a macrocycle comprising a steroidal moiety and another macrocycle comprising a monomeric flexible moiety, (ii) a macrocycle comprising a steroidal moiety and a monomeric flexible moiety, or (iii) a macrocycle comprising a steroidal moiety and a monomeric flexible moiety and another macrocycle comprising a monomeric flexible moiety; and (B) polymerizing the macrocycles provided in (a) by ring-opening metathesis polymerization, thereby obtaining the polymer.

In embodiments, the ring-opening metathesis polymerization may be entropy-driven.

In embodiments, the ring-opening metathesis polymerization may be carried out with a coordination/insertion catalyst.

In embodiments, the catalyst may be a metathesis catalyst. The catalyst may be ruthenium-based. In more specific embodiments, the catalyst may be a Grubbs' catalyst. In embodiments, the catalyst may be of formula:

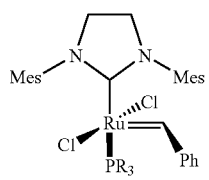

wherein R may be cyclohexyl, phenyl or p-$CF_3C_6H_4$, of formula:

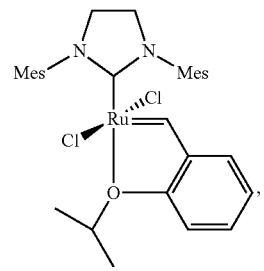

of formula:

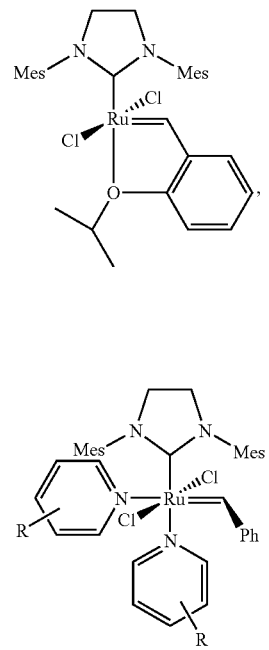

wherein R may be H, 3-Br, or 4-Ph, or of formula:

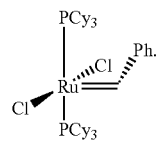

In embodiments, the catalyst may be tin octoate.

In embodiments, the catalyst may be an enzymatic catalyst. More specifically, the catalyst may be Novozyme.

In embodiments, the steroidal moiety may comprise at least four cycles. More specifically, the cycles may be fused.

In embodiments, the monomeric flexible moiety may have a main chain comprising at least 12 atoms. More specifically, the main chain may be carbon-based and may be linear, branched, cyclic or a combination thereof. In more specific embodiments, the main chain may be acyclic.

In embodiments, the main chain may comprise one or more ester, amide, anhydride, urethane, urea, imide, imine, diazene, alkene, alkyne, ketone, sulfone, thioether, thioester, or fluoroalkane group, In embodiments, the main chain may be substituted by one or more of alkyl, aryl, fluoroalkyl, alkoxyl, hydroxyl, amine, nitrile, imine, ketone, aldehyde, carboxylic acid, carboxylate, ester, amide, imide, urethane, urea, anhydride, thiol, sulfonic acid, sulfonate, sulfonyle, bromide, chloride, iodide, azide, thioester, alkene, alkyne, ether, thioether, thioester, phosphoric acid, phosphorate or phosphine.

In embodiments, the steroidal moiety may be of formula:

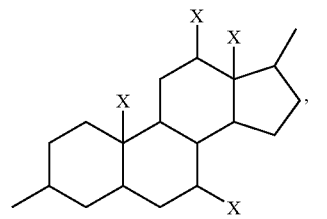

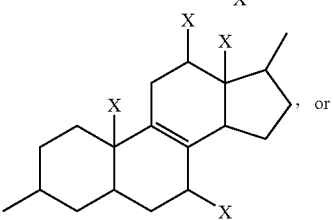, or

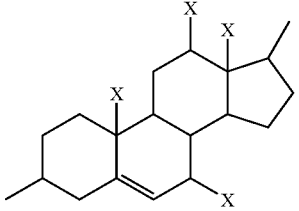

wherein X may be the same or different and represents hydrogen, alkyl, aryl, fluoroalkyl, alkoxyl, hydroxyl, amine, nitrile, imine, ketone, aldehyde, carboxylic acid, carboxylate, ester, amide, imide, urethane, urea, anhydride, thiol, sulfonic acid, sulfonate, sulfonyle, bromide, chloride, iodide, azide, thioester, alkene, alkyne, ether, thioether, thioester, phosphoric acid, phosphorate or phosphine.

In embodiments, the steroidal moiety may be a polycyclic core of a bile acid.

In embodiments, the macrocycle in (ii) may be:

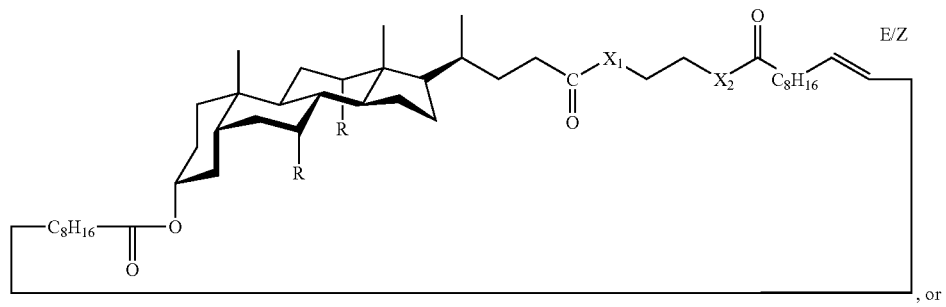, or

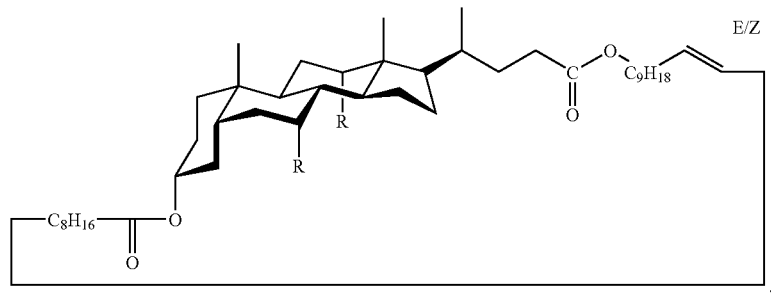, wherein R may be independently H or OH and $X_1$ and $X_2$ may independently be O or NH.

In embodiments, the macrocycles in (iii) may be

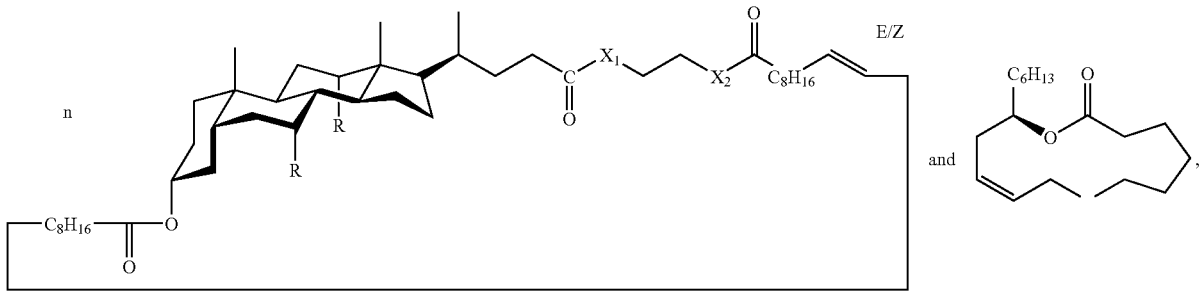

wherein R may be independently H or OH and $X_1$ and $X_2$ may be independently O or NH.

DETAILED DESCRIPTION OF THE INVENTION

Turning now to the invention in more details, there is provided a polymer having a number average molecular weight (Mn) of about 10 000 g/mol or more comprising a monomeric rigid moiety R and a monomeric flexible moiety F, wherein R comprises a main-chain polycyclic core and F has a main chain comprising a number of atoms sufficient for the transition temperature of the polymer to be lower than the degradation temperature of the polymer.

The polymer may be of formula

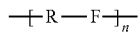

wherein R is the monomeric rigid moiety comprising a main-chain polycyclic core and F is the monomeric flexible moiety having a main chain comprising a number of atoms sufficient for the transition temperature of the polymer to be lower than the degradation temperature of the polymer.

As shown in the examples below, the inventors have synthesized polymers that display shape memory effects in warm and/or cold drawing modes. Also, these polymers may be tailored to display rubber like elasticity, slow heterogeneous degradation, and/or low Young moduli close to those of many soft tissues. Finally, these polymers may also be tailored to be thermoplastics, amorphous, degradable and/or non-toxic.

As used herein, a "polymer" is a high molecular weight molecule whose structure consists of a long chain comprising a large number of repeated small structural subunits, the monomers, strung together. Such polymer comprises a main chain, which is the series of bonded atoms that together create the continuous chain of the molecule.

As used herein, a "monomeric moiety" is a monomer, part of a monomer or both. In the formula above, R and F are monomeric moieties. Thus, both R and F can constitute separate monomers or both R and F can be parts of a single monomer. Also, a monomer can comprise R and a part of F while a second monomer can comprise the other part of F and vice versa. Each monomeric moiety has its main chain, which is part of the main chain of the polymer.

In embodiments, the polymer may be a homopolymer, an alternating copolymer, a periodic copolymer, a random copolymer, or a block copolymer. As used herein, a "homopolymer" means a polymer derived from only one type of monomer. In the present case, such monomer would include both R and F. As used herein, a "copolymer" is subclass of polymer and designates a polymer derived from at least two types of monomers (for example A and B). As used herein, an "alternating copolymer" means a copolymer wherein the two types of monomers are regularly alternating (for example ABABABABAB). As used herein, a "periodic copolymer" means a copolymer wherein the two types of monomer are arranged in repeating sequence [for example (ABABBAAAABBB)$_n$]. As used herein, a "random copolymer" means a copolymer wherein the two types of monomer are arranged in random sequence (for example ABBBABABAA). As used herein, a "block copolymer" means a copolymer wherein the two types of monomer are arranged in two homopolymer subunits (for example BBBBBB-BAAAAAAAA).

As used herein, the terms "rigid" and "flexible" are relative terms. The flexible moiety is a structure that is more flexible than the rigid moiety. By more flexible, it is meant that the number of stable conformations that can be adopted by the flexible moiety is larger than that of the rigid moiety.

It is to be understood that the polymer represented by the above formula may comprise a mixture of different monomeric rigid moieties (R) and monomeric flexible moieties (F). The present invention is intended to cover such polymers.

As used herein, a "polycyclic core" refers to part of a molecule comprising at least two cycles either fused together or linked via one single or double bond. As used herein, a "cycle" is a loop or ring comprising three or more of atoms. More specifically, the cycles may comprise 4, 5, 6 or more atoms. However, all of the cycles of a polycyclic core do not need to comprise the same number of atoms.

The atoms in the cycles may be any atoms allowing the formation of cycles. Non limiting examples of such atoms are carbon, nitrogen, oxygen, sulfur, and the like. For certainty, the term "cycle" also includes all-carbon cycles, heterocycles and metallocycles.

As used herein, a "main chain polycyclic core" means that at least some of the atoms of the cycles of the polycyclic core are part of the main chain of the polymer. For example, 5, 7, 9 or more of the atoms of the cycles may be part of the main chain.

It is to be understood that each of the cycles of the polycyclic core may bear one or more substituents. Non limiting examples of such substituents include alkyl, aryl, fluoroalkyl, alkoxyl, hydroxyl, amine, nitrile, imine, ketone, aldehyde, carboxylic acid, carboxylate, ester, amide, imide, urethane, urea, anhydride, thiol, sulfonic acid, sulfonate, sulfonyle, bromide, chloride, iodide, azide, thioester, alkene, alkyne, ether, thioether, thioester, phosphoric acid, phosphorate, phosphine. Other examples include both natural and unnatural amino acids.

In embodiments, amine may be primary, secondary, tertiary or quaternary amine.

In embodiment, the secondary amine, tertiary amine, quaternary amine, imine, ketone, ester, amide, imide, urethane, anhydride, sulfonyle, thioester, ether and thioether may comprise (as their second, third or fourth substituent) an alkyl or an aryl group. These alkyl or aryl groups may bear one or more of the substituents listed above in regard of the polycyclic core.

In embodiments, alkyl, fluoroalkyl, alkoxyl, alkene and alkyne may be $C_1$-$C_{12}$ alkyl, $C_1$-$C_{12}$ fluoroalkyl, $C_1$-$C_{12}$ alkoxyl, $C_1$-$C_{12}$ alkene and $C_1$-$C_{12}$ alkyne, respectively. In embodiments, aryl may be $C_5$ to $C_{12}$ aryls.

The main chain of the monomeric flexible moiety comprises a number of atoms sufficient for the transition temperature of the polymer to be lower than the degradation temperature of the polymer. As used herein, the transition temperature of a polymer is either the glass transition temperature ($T_g$) or the melting point of the polymer. The degradation temperature of a polymer is the temperature at which the polymer starts to degrade into smaller units.

In embodiments, the transition temperature of the polymer may be 50, 75, 100° C. or more lower than the degradation temperature of the polymer.

In embodiments, the polycyclic core may comprise at least three cycles, at least four cycles or even more cycles.

In embodiments, the cycles comprised in the polycyclic core may be 5- or 6-membered carbon-based cycles. As used herein, a "carbon-based cycle" is a cycle wherein at least about a third of the atoms forming the cycle are carbon, the other atoms being N, O, or S. In embodiments, about half of the atoms forming the cycle may be carbon. In more specific embodiments, all of the atoms forming the cycle may be carbon.

In embodiments, the cycles may be aliphatic. As used herein, an "aliphatic" compound is an organic compound in which carbon atoms are joined together in straight or branched chains or in rings. These compounds may be either saturated or unsaturated, but not aromatic. Therefore, an aliphatic cycle is thus a non-aromatic cycle.

In embodiments, the cycles may be fused. As used herein, "fused" mean that the cycles have at least one bond in common.

In embodiments, R may comprise a steroidal moiety. As used herein, a "steroidal moiety" is a compound based on a carbon skeleton with four fused rings arranged in a 6-6-6-5 fashion as shown below:

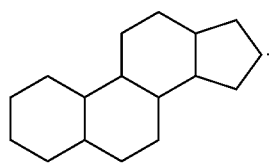

Formula (I)

All of the stereoisomer of the steroidal moiety may be used and the cycles can adopt any conformation with respect to each other.

The steroidal moiety may be linked to the rest of the polymer at any position as long as at least 5 carbon atoms of the cycles of the steroidal moiety are part of the main chain of the polymer. Advantageously, the steroidal moiety may be linked to the rest of the polymer by rings A and D as shown below.

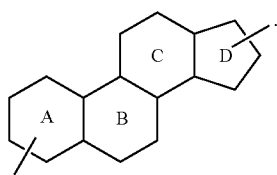

In embodiments, the steroidal moiety is linked to the rest of the polymer at position 3 and 7; 3 and 12; 3 and 17; 12 and 7; 7 and 17; or 12 and 17. In more specific embodiments, the steroidal moiety is linked to the rest of the polymer at position 3 and 17 as shown below.

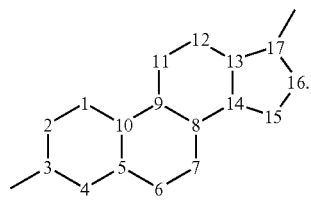

As used herein, "steroidal moiety" also includes compounds based on the carbon skeleton of Formula (I) that comprise one or more double or triple bond at any given position, but are not aromatic. More specifically, the steroidal moiety may comprise a double bond at the positions shown below:

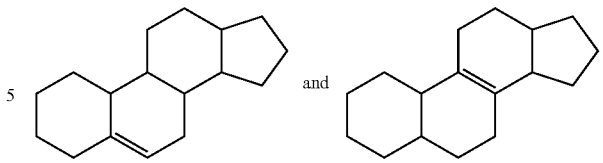

As used herein, "steroidal moiety" also includes compounds based on the carbon skeleton of Formula (I) wherein any one of the cycle of the steroidal moiety is opened (by breaking one of its constituting bonds) so as to form a tricyclic core comprising either 3 fused cycles or 2 fused cycles linked to the third cycle by one single or double bond. A non-limiting example of an opened steroidal moiety is shown below:

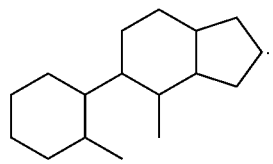

As used herein, "steroidal moiety" also includes compounds based on the carbon skeleton of Formula (I) wherein any of the cycle of the steroidal moiety comprise one of more heteroatoms. Non limiting example of heteroatoms includes O, N and S.

As used herein, "steroidal moiety" also includes compounds based on the carbon skeleton of Formula (I) bearing one or more substituents. These substituents may be at any position on the cycles of the steroidal moiety. More specifically, the substituents may be at position 3, 7, 12 and/or 17 (or at corresponding positions in an opened steroidal moiety).

Non limiting examples of substituents that can be borne by the cycles of the steroidal moiety include all those recited above with regard to the monomeric rigid moiety.

In specific embodiments, R may be of formula:

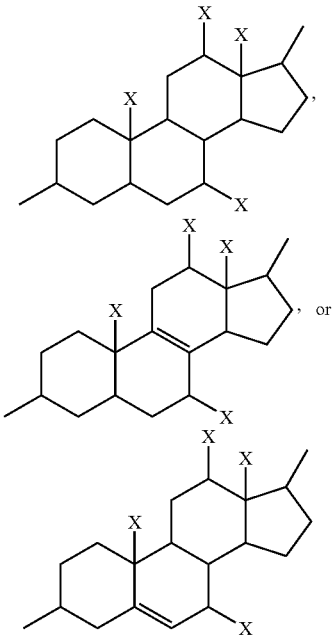

wherein X is the same or different and represents hydrogen, or any of the substituents recited above with regard to the monomeric rigid moiety.

In more specific embodiments, R may be a polycyclic core of a bile acid. As used herein, "bile acid" means the steroid acids found predominantly in the bile of mammals, produced in the liver by the oxidation of cholesterol, conjugated, and stored in the gallbladder. Bile acids constitute a large family of molecules, which typically comprise a steroid structure with four rings, a five or eight carbon side-chain terminating in a carboxylic acid, and the presence and orientation of different numbers of hydroxyl groups. Non-limiting examples of bile acids include cholic acid, chenodeoxycholic acid, glycocholic acid, taurocholic acid and deoxycholic acid.

In embodiments, R may be of formula:

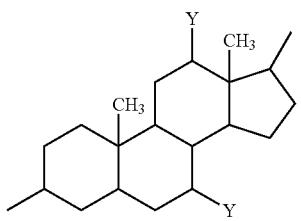

wherein Y is H or OH.

In embodiments, R may also be a dimer of steroidal moieties. As used herein, a dimer of steroidal moieties means two steroidal moieties linked together by a spacer. For example, a dimer of steroidal moieties may be:

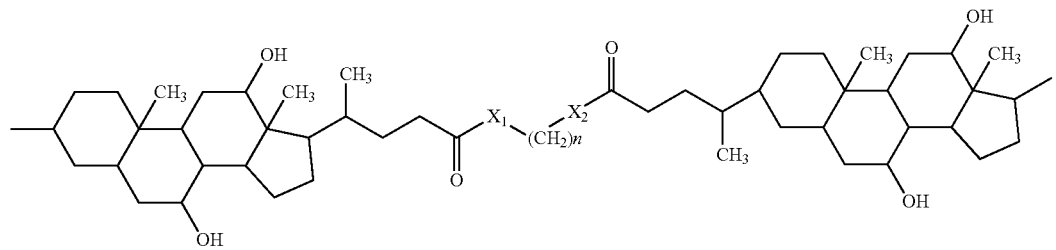

wherein $X_1$ and $X_2$ independently may be O or NH and n may be between 2 and 12. The above example shows a dimer of cholic acid. This example is not meant to be limiting as dimers of other bile acids can also be synthesized as explained herein.

The number of atoms in the flexible moiety is determined by the desired flexibility of the polymer. This number varies depending on the exact nature of the rigid moiety involved as well as the nature of the flexibly moiety itself. The length of the flexible moiety correlates to its flexibility and therefore determines the position of the transition temperature: the longer the flexible moiety, the lower the transition temperature.

In embodiments, the main chain of the flexible moiety may comprise at least 12, 15, 20, 25, 30 or 35 atoms. In more specific embodiments, main chain of the flexible moiety may comprise between about 26 and about 29 atoms.

In embodiments, the main chain of the monomeric flexible moiety may comprise a series of atoms including C, N, O, P, S and metals. In specific embodiments, this main chain may be carbon-based. As used herein, a "carbon-based main chain" is a main chain wherein at least about half of the atoms forming the main chain are carbon, the other atoms being N, O, S or P.

In more specific embodiments, the main chain is linear, branched, cyclic or a combination thereof. By "combination thereof", it is meant that the main chain may comprise a linear part, a branched part and/or a cyclic part at the same time. It is to be understood the main of chain does not comprise so many cycles that it becomes rigid.

In more specific embodiments, the main chain is acyclic, which means the main chain is linear or branched only.

In embodiments, the main chain may comprise one or more ester, amide, anhydride, urethane, urea, imide, imine, diazene, alkene, alkyne, ketone, sulfone, thioether, thioester, or fluoroalkane group. Specific embodiments of these substituents are as described above with respect to the monomeric rigid moiety.

In embodiments, the main chain may be substituted by one or more of alkyl, aryl, fluoroalkyl, alkoxyl, hydroxyl, amine, nitrile, imine, ketone, aldehyde, carboxylic acid, carboxylate, ester, amide, imide, urethane, urea, anhydride, thiol, sulfonic acid, sulfonate, sulfonyle, bromide, chloride, iodide, azide, thioester, alkene, alkyne, ether, thioether, thioester, phosphoric acid, phosphorate or phosphine. Specific embodiments of these substituents are as described above with respect to the monomeric rigid moiety.

In this particular context, the "main chain comprise" means that at least part of the atoms of the named functional groups will become part of the main chain of the flexible moiety and thus of the main chain of the polymer. On the other hand, the "main chain is substituted" means that the substituent will not become part of the main chain, but will rather be part of a side chain.

In embodiments, F is of formula:

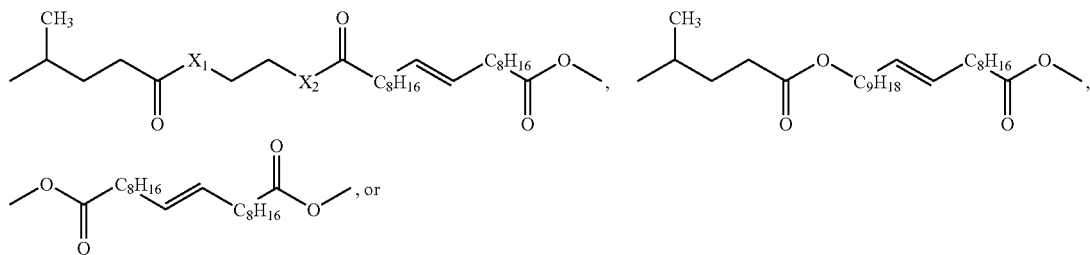

-continued

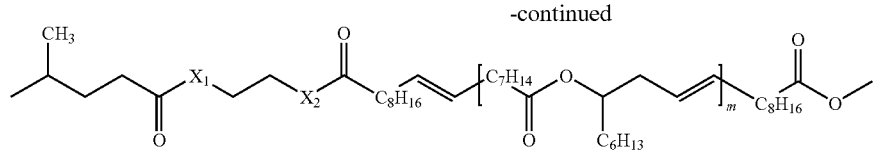

wherein $X_1$ and $X_2$ independently are O or NH and m varies is at least 1. In more specific embodiments, m may vary between 1 and 10.

In embodiments, the polymer may have a glass transition ($T_g$) temperature between about −75 and about 200° C., between about −55 and about 120° C., between about −25 and about 70° C. or between about room temperature and about 70° C.

In embodiments, the polymer may have a number average molecular weight ($M_n$) of about 20 000, 30 000, 40 000, 60 000, 80 000, 100 000 g/mol or more.

The materials of the present invention may be used for many applications. Among other, these materials may be used in biomedical devices such as smart sutures, stents and stent-grafts. These stents and stent-graft may be used in the treatment of aneurysms for example. Therefore, the present invention relates to a biomedical device, a stent, a stent-graph or a suture comprising the above polymer.

These materials may also be used in tissue engineering. More specifically, these materials may be used as a scaffold or a support in tissue engineering of, for example, soft tissues such as the aorta, elastic cartilages and the skin. Therefore, the present invention relates to a scaffold or a support for tissue engineering, the scaffold or support comprising the above polymer.

The materials of the present invention may also be used in delivery devices for the controlled release of an active ingredient. In embodiments, these delivery devices may be implants, patches, or the like.

Also, in embodiments, these delivery devices may be liquid pharmaceutical compositions which are sterile suspensions that can be administered orally or for example by intravenous, intramuscular, intrathecal, epidural, intraperitoneal or subcutaneous injection. In this case, the active ingredient and the material of the invention are in the form of beads or particles suspended in the liquid pharmaceutical composition. Also, the active ingredient and the material of the invention may be prepared as a sterile solid composition (beads or particles) which may be suspended at the time of administration using sterile water, saline, or other appropriate sterile orally administrable or injectable medium.

Also, in embodiments, these delivery devices may be solid pharmaceutical compositions. Non-limiting examples of suitable solid pharmaceutical compositions include suppository, pills, capsules, granules, tablets, caplets, lozenges, and powders.

Optimal dosages to be administered may be determined by those skilled in the art, and will vary with the particular active ingredient used, the strength of the preparation, the mode of administration, and the advancement of the disease condition. Additional factors depending on the particular subject being treated will result in a need to adjust dosages, including subject age, weight, gender, diet, and time of administration.

Methods and suitable adjuvants for preparing such pharmaceutical compositions are known in the art.

Therefore, the present invention relates to a delivery device for the controlled release of an active ingredient, the delivery device comprising the above polymer. More specifically, the invention relates to such devices as implants and patches.

As used herein, an active ingredient includes any of one or more substances that produces or promotes a beneficial therapeutic, physiological, homeopathic, allopathic and/or pharmacological effect on the body. Such beneficial effects may be brought upon any animal or human patient, and various systems associated therewith, including the immune system, respiratory system, circulatory system, nervous system, digestive system, urinary system, endocrine system, muscular system, skeletal system, and the like, as well as any organs, tissues, membranes, cells, and subcellular components associated therewith. As will be appreciated by those skilled in the art, beneficial effects include assisting the more efficient functioning of the various systems described above, such as, for example, helping the body fight sickness and disease, helping the body to heal, etc. Exemplary active substances include any element, composition or material producing a beneficial effect, including vitamins, minerals, nucleic acids, amino acids, peptides, polypeptides, proteins, genes, mutagens, antiviral agents, antibacterial agents, anti-inflammatory agents, decongestants, histamines, anti-histamines, anti-allergens, allergy-relief substances, homeopathic substances, pharmaceutical substances, and the like.

In addition, the above polymer could be used in smart textile applications. One example of smart textile is a textile that retracts or extends as a function of the heat emitted by the wearer.

In addition, the above polymers could be used in reusable moulds.

Also, the above polymers could be use for producing vehicle parts. Such parts could be self repairing, which means that deformed part could recover their original shape by being heated. Examples of vehicles that could advantageously comprise such parts are cars, trucks, motorcycles, and other road vehicles.

The above polymers could be used to manufacture tubing. Such tubes could be, for example, heat shrinkable tubes. These tubes could, for example, be part of security devices of other.

The above polymers could also be used for the active disassembly of devices. An active disassembly device would have some of its pieces made of the above polymer so that the device falls apart when heated.

Similarly, the above polymers could be used in microactuators in fields such as robotics for example.

These polymers could also be used as a toy or as a part of a toy.

The above polymers could also be used as inflatable membrane reflectors for space and ground applications. Such a membrane would self inflate when properly stimulated (e.g. heated).

Therefore, in summary, the present invention also relates to a textile biomedical device comprising the above polymer. The biomedical device may be a stent, a stent-graph, a suture, a scaffold or a support for tissue engineering, or a delivery device for the controlled release of an active ingredient. This delivery device may be an implant, a patch, a liquid pharmaceutical composition or a solid pharmaceutical composition. The present invention also relates to a device comprising the above polymer. This device may be a textile, a mould, a vehicle part, a tube, an active disassembly device, a microactuator, a toy or an inflatable membrane.

The present invention further relates to methods of manufacturing the above polymers containing steroidal moieties.

There is therefore provided a method of manufacturing a polymer, said method comprising: (a) providing (i) a macrocycle comprising a steroidal moiety and another macrocycle comprising a monomeric flexible moiety, (ii) a macrocycle comprising a steroidal moiety and a monomeric flexible moiety, or (iii) a macrocycle comprising a steroidal moiety and a monomeric flexible moiety and another macrocycle comprising a monomeric flexible moiety; and (b) polymerizing the macrocycles provided in (a) by ring-opening metathesis polymerization thereby obtaining the polymer.

As used herein, a "macrocycle" is a cycle which ring comprises at least 10 atoms.

Ring-opening polymerization (ROP) is a very versatile technique. In virtually all cases, small strained cycles (3-8-membered rings) are used and enthalpy drives the polymerization. However, macrocycles, including those based on esters and alkenes, could be polymerized, and afforded appreciably high molecular weights, depending on the conditions [Hodge et al., *Angew. Chem.* 2003, 115, 2514-2516; Hodge et al., *Angew Chem. Int Ed.* 2003, 42, 2412-2414; Hodge et al., *Polym. Adv. Technol* 2005, 16, 84-94; Tripathy et al., *Macromolecules* 2004, 37, 6793-6800; Kamau et al., *Polym. Adv. Technol* 2003, 14, 492-501; Nomura et al., *Macromolecules* 1994, 27, 620-621.] In these cases, polymerization is often driven by entropy, as described by the Jacobson-Stockmayer theory for ring-chain equilibria. [Jacobson et al. *Chem. Phys.* 1950, 18, 1600-1606; Semlyen, *Adv. Polym. Sci.* 1976, 21, 41-75; Chen et al., *Macromolecules* 1995, 28, 2147-2154.]

In embodiment, the ring-opening metathesis polymerization may thus be entropy-driven. As used herein, an "entropy-driven ring-opening metathesis polymerization", also designated "ED-ROMP", refers to a polymerization driven by entropy and proceeding by ring opening of macrocycles containing the monomers to be polymerized.

In embodiments, the ring-opening metathesis polymerization may be carried out with a coordination/insertion catalyst. In more specific embodiments, the catalyst may be a metathesis catalyst. More specifically, the catalyst may be ruthenium-based.

In embodiments, the catalyst may be a Grubbs' catalyst. Such catalysts are well known in the art (see Love et al, Angew. Chem. Int. Ed. 2002, 41, 21, 4035-4067 and Trnka et al. J. Am. Chem. Soc. 2003, 125, 2546-2558, which are herein incorporated by reference in their entirety).

The catalyst may be of formula:

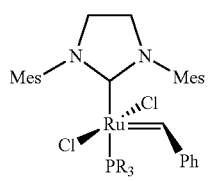

wherein R is cyclohexyl, phenyl or p-CF$_3$C$_6$H$_4$ and wherein Ph means phenyl and Mes means 2,4,6-trimethylphenyl. The catalyst may also be of formula:

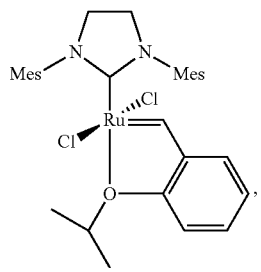

wherein Mes means 2,4,6-trimethylphenyl. The catalyst may also be of formula:

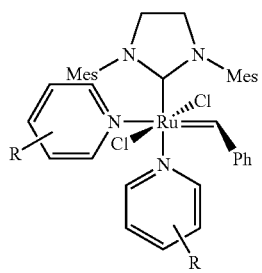

wherein R may be H, 3-Br, or 4-Ph and wherein Mes means 2,4,6-trimethylphenyl. The catalyst may also be of formula:

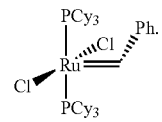

In embodiments, the catalyst may be tin octoate.

In embodiments, the catalyst may be an enzymatic catalyst. In more specific embodiments, the catalyst may be Novozyme.

In the method of the invention, the steroidal moiety and the monomeric flexible moiety are as described above with respect to the polymer. More specifically, in embodiments, the steroidal moiety may comprise at least four cycles. Also, these cycles may be fused.

In embodiments, the monomeric flexible moiety may have a main chain comprising at least 12 atoms. In specific embodiments, the main chain may be carbon-based and may be linear, branched, cyclic or a combination thereof. In more specific embodiments, the main chain may be acyclic.

In embodiments, the main chain may comprise one or more ester, amide, anhydride, urethane, urea, imide, imine, diazene, alkene, alkyne, ketone, sulfone, thioether, thioester, or fluoroalkane group. Also, the main chain may be substituted by one or more of alkyl, aryl, fluoroalkyl, alkoxyl, hydroxyl, amine, nitrile, imine, ketone, aldehyde, carboxylic acid, carboxylate, ester, amide, imide, urethane, urea, anhydride, thiol, sulfonic acid, sulfonate, sulfonyle, bromide, chloride, iodide, azide, thioester, alkene, alkyne, ether, thioether, thioester, phosphoric acid, phosphorate or phosphine.

In embodiments, the steroidal moiety may be of formula:

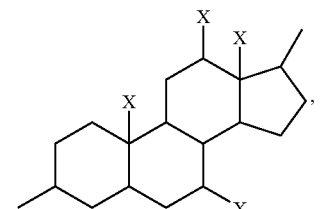,

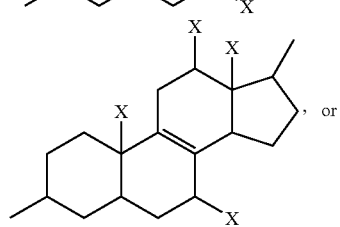, or

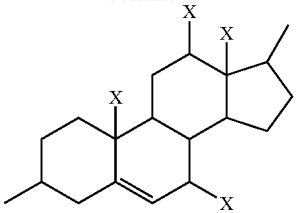

wherein X is the same or different and represents hydrogen, alkyl, aryl, fluoroalkyl, alkoxyl, hydroxyl, amine, nitrile, imine, ketone, aldehyde, carboxylic acid, carboxylate, ester, amide, imide, urethane, urea, anhydride, thiol, sulfonic acid, sulfonate, sulfonyle, bromide, chloride, iodide, azide, thioester, alkene, alkyne, ether, thioether, thioester, phosphoric acid, phosphorate or phosphine.

In embodiments, the steroidal moiety may be a polycyclic core of a bile acid.

In embodiments, the macrocycle in (ii) may be:

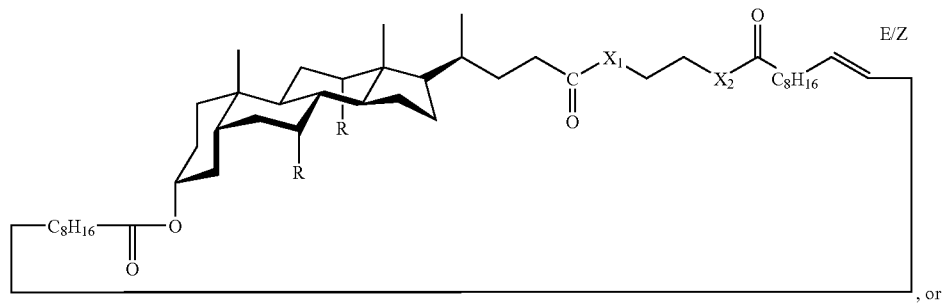, or

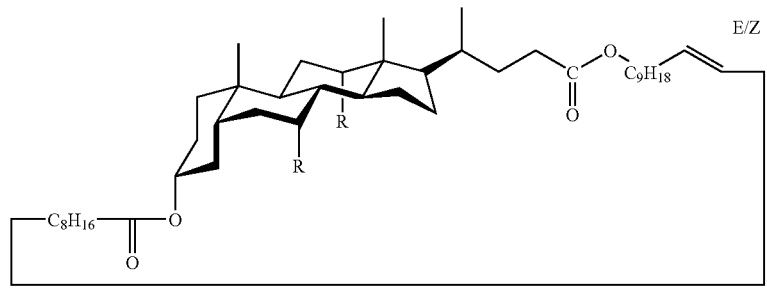, wherein R is independently H or OH and $X_1$ and $X_2$ are independently O or NH.

In embodiments, the macrocycles in (iii) may be:

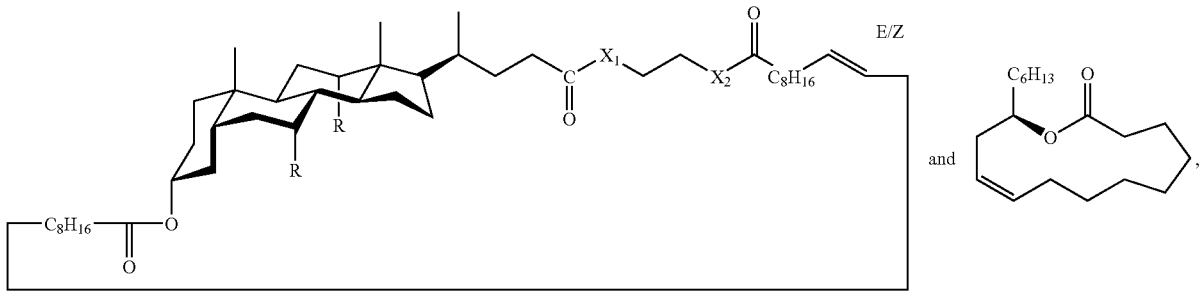

wherein R are independently H or OH and $X_1$ and $X_2$ is independently O or NH.

Throughout the present application, the right angles in the loops of the macrocycles do not represent carbon atoms, but are used only to draw closed loops. For example, the two formulas below represent the same macrocycle.

As used herein, "about" means plus or minus 5% of the value so qualified.

Other objects, advantages and features of the present invention will become more apparent upon reading of the following non-restrictive description of specific embodiments thereof, given by way of example only with reference to the accompanying drawings.

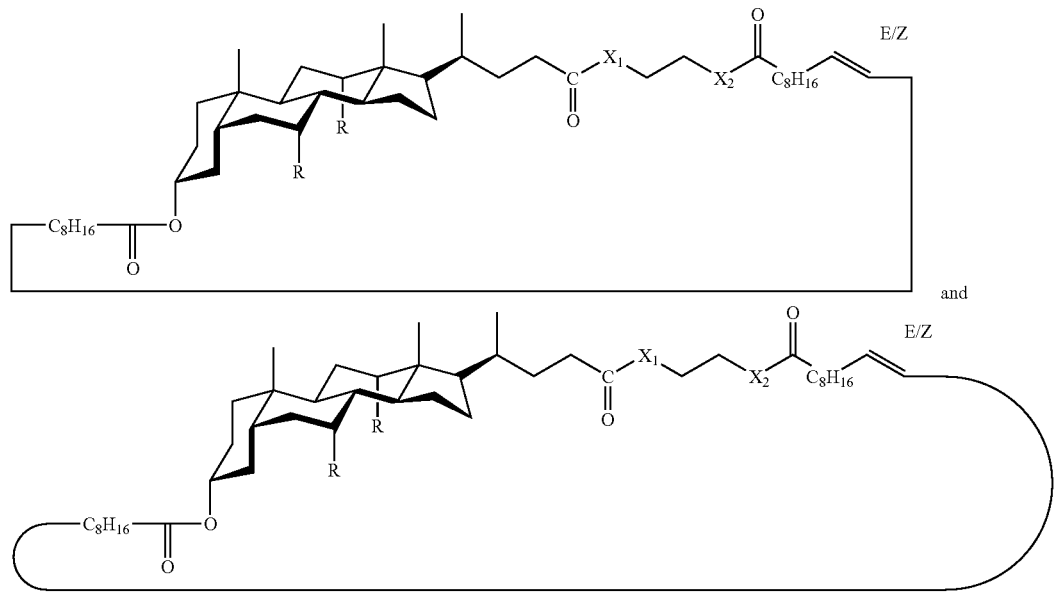

The use of the above technique means that the use of large amounts of coupling agents often required in polycondensations can be avoided, thus considerably lowering the toxicity of the resulting material. From an industrial point of view, ED-ROMP offers the advantage of releasing no heat, unlike enthalpy-driven polymerizations, [Hodge et al. *Polym. Adv. Technol* 2005, 16, 84-94] and no volatiles, which allows in situ polymerizations to be carried out in biosystems with, for example, transesterification enzymes. Furthermore, the lower viscosity typical of macrocycles, relative to high-molecular-weight polymers, makes ED-ROMP very suitable for micromolding, a topic of importance for the design of a new generation of biomedical devices.

In the above polymer and method, the choice of the rigid and flexible moiety enables the tuning of the characteristics of the polymers (such as Young modulus, transition temperature, degradation rate, shape memory performances, and hydrophilicity). For example, the mechanical properties (glass transition temperature and Young modulus) and the amphiphilicity/hydrophilicity of the materials can be tuned very finely to meet the requirements of specific applications. The possibility of very fine tuning of $T_g$ means that the kinetics of shape recovery can be controlled very precisely.

Furthermore, when two different macrocycles are used, it is possible to fine tune the composition of resulting polymer simply by tuning the composition of the starting mixture during the polymerization step. It is therefore possible to synthesize materials displaying properties with a continuum of characteristics. In fact, a calibration curve can be obtained for the evolution of $T_g$ and Young moduli for each particular polymer in function of its composition. From this calibration curve, the targeted $T_g$ and Young moduli of a material can be obtained with great precision in order to meet the requirement of a particular device or application.

All this enables to tune very finely the properties of a material to be used for a specific application and therefore optimize the overall performance of the device.

BRIEF DESCRIPTION OF THE DRAWINGS

In the appended drawings:

FIG. 4 shows the characterization of cyclic oligomers prepared from diene 5a;

FIG. 11 is the chemical structure of polymer 10a;

FIG. 12 is the proton NMR spectra of polymer of 10a;

DESCRIPTION OF ILLUSTRATIVE EMBODIMENTS

The present invention is illustrated in further details by the following non-limiting examples.

Example 1

Specific embodiments of polymers of the invention were prepared according to the reaction scheme shown in FIG. 2 and tested as follows.

Figure 3:
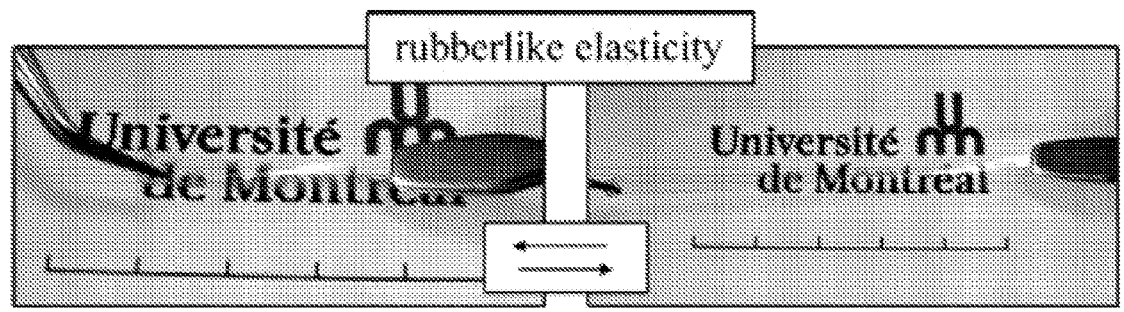
FIG. 3 shows the elongation of a film of polymer 1a (0.1 mm thick) displaying rubberlike elasticity.

More specifically, novel polymers were synthesized by ring-closure metathesis (RCM) of two flexible chains attached to a bile acid core through ester bonds, and their entropy-driven ring-opening metathesis polymerization (ED-ROMP) using ruthenium-based Grubbs catalysts. The polymers obtained show typical rubberlike elasticity, with elongation moduli that favorably compare to those of soft tissues and elastin [Park et al., Biomaterials: An Introduction, 2nd ed., Plenum, N.Y., 1992; Gosline et al., Philos. Trans R Soc. London 2002, 357, 121-132.] (see FIG. 3) and constitute, to the best of the inventor's knowledge, the first example of degradable thermoplastic amorphous elastomers.

Reagents

Lithocholic acid, ω-undecylenyl alcohol and ω-undecenoyl chloride were purchased from Aldrich, Grubbs' catalysts ($1^{st}$ and $2^{nd}$ generations) from Fluka, and solvents from VWR. Dichloromethane (DCM) was dried using a solvent purification system from Glass Contour. Silica gel 230-400 mesh for chromatography was purchased from Qingdao Meicao Co., China. Tetrahydrofuran (THF) for GPC was filtered using white nylon 0.2 μm Millipore filters. Ethylene glycol lithocholate was synthesized following methods adapted from the literature [Hu et al., Steroids 2005, 70, 531-537].

Instruments

Melting points were measured using a SMP10 apparatus (Rose Scientific) with a 2° C./min heating rate. Thermogravimetric analyses (TGA) were carried out on a Hi-Res TGA 2950 thermogravimetric analyzer (TA Instruments) ($T_{dec}$ was defined as the onset of decomposition temperature). Differential scanning calorimetry (DSC) measurements were carried out on a DSC 2910 differential scanning calorimeter from TA Instruments ($T_g$ was defined as the inflection point temperature of the transition, heating rate was 10° C./min). IR spectra were recorded on an Excalibur HE series FTS 3100 instrument from Digilab. $^1$H and $^{13}$C NMR spectra were recorded on a Bruker AV400 spectrometer operating at 400.13 MHz for proton and 100.61 MHz for carbon.

Accurate mass measurements were performed on a LC-MSD-TOF instrument from Agilent Technologies in positive electrospray. MALDI-TOF spectra were acquired on an Autoflex apparatus from Bruker Daltonics, equipped with a nitrogen laser (337 nm) and the Flex Control software. The positive reflectron mode was used, with an ion source 1 of 19.00 kV, an ion source 2 of 16.40 kV, a lens of 8.60 kV, a reflector of 20.00 kV, a pulsed ion extraction of 60 ns, a laser frequency of 5.0 Hz (100 shots) and a laser attenuation between 50 and 65%. Solutions of the mixtures of analyte/matrix/salt were prepared in THF and drop cast directly on the substrate. For calibration, the peptide calibration standard from Bruker Daltonics was used.

GPC was performed on a Breeze system from Waters equipped with a 717 plus autosampler, a 1525 Binary HPLC pump and a 2410 refractive index detector. Three Styragel columns HR3, HR4 and HR6 (all three 7.8×300 mm) in series (from Waters) were used for resolving the different samples. The flow rate of the eluent (THF) was 1 mL/min. The temperature of the columns was 33° C. For calibration, the polystyrene kit SM-105 (10 points) from Shodex was used. Quantitative analysis of cyclic oligomers/polymer ratios was carried out by measuring areas under the relevant peaks and correcting the resulting ratios using a calibration curve obtained with mixtures of known amounts of cyclic monomer 7a and polymer 1a.

Polymer films for mechanical tests were prepared by evaporating a concentrated DCM solution (100 mg/mL) of the desired polymer in a PTFE mould (2×2 cm) under atmospheric pressure for one day and then under reduced pressure for another day. Smaller rectangular samples (3.5 mm×2 cm) were cut from these films and used for mechanical tests (dimensions of the films were measured with an electronic digital caliper and a precision of 0.01 mm). Dynamic mechanical analysis was carried out on a DMA 2980 dynamic mechanical analyzer from TA instruments. For multi-frequency experiments, a preload force of 0.04 N, an amplitude of 10 μm, a temperature sweeping rate of 1° C./min and frequencies of 1, 10 and 100 Hz were used. Only results obtained at 1 Hz are displayed. Results obtained at 10 and 100 Hz are statistically equivalent. For controlled force (stress-strain) experiments, a preload force of 0.03 N and a force ramp of 0.1 N/min were used. For stress relaxation experiments, a preload force of 0.01 N and a initial strain of 25% were used. Results were obtained in quintuplicate.

Preparation of the Materials

ω-Undecylenyl lithocholate 4. Lithocholic acid (2.00 g, 5.31 mmol), ω-undecylenyl alcohol (6 mL) and concentrated sulfuric acid (0.01 mL) were placed in a round-bottom flask under nitrogen. This mixture was heated up to 90° C. and stirred at this temperature for 5 h. After allowing to cool down, the resulting mixture was dissolved in ethyl acetate (50 mL), extracted with water (3×50 mL), dried with magnesium sulfate, filtered and the solvent evaporated off. Chromatography (silica gel, petroleum ether/ethyl acetate 90/10) afforded a colorless oil (2.53 g, 90%). IR (NaCl, cm$^{-1}$) 3373, 2928, 2857, 1737, 1449, 1376, 1305, 1247, 1168, 1069, 1039, 994 and 909; $^1$H NMR (CDCl$_3$, ppm) δ 5.81 (1H; m; CH=C), 4.95 (2H; m; CH$_2$=C), 4.05 (2H; t, J=7 Hz; CH$_2$OC$\overline{\text{O}}$), 3.62 (1H; m; H-3), 2.27 (2H; m; CH$_2$COO), 2.08-0.93 (43H; mm), 0.91 (3H; s; 21-CH$_3$), 0.90 (3H; s; 19-CH$_3$) and 0.64 (3H; s;

18-CH$_3$); $^{13}$C NMR (CDCl$_3$, ppm) δ 12.39, 14.55, 18.60, 21.17, 23.72, 24.55, 26.29, 26.76, 27.54, 28.53, 29.00, 29.26, 29.45, 29.58, 29.74, 29.81, 30.90, 31.39, 31.70, 34.15, 34.91, 35.69, 36.19, 36.80, 40.51, 40.77, 42.43, 43.08, 56.32, 56.83, 64.76, 72.22, 114.48, 139.55 and 174.80 (35 obs, 35 req); MS (electrospray) 529.4608, C$_{35}$H$_{60}$O$_3$H$^+$ requires 529.4621; elemental analysis: calc: C, 79.5%, H, 11.5%; found: C, 79.7%, H, 11.7%.

Diene 5a. Ethylene glycol lithocholate 3a (5.00 g, 11.9 mmol), DCM (anhydrous, 40 mL) and triethylamine (freshly distilled, 5.7 mL, 41.3 mmol) were placed in a flame-dried round-bottom flask (3-neck, 100 mL) fitted with a pressure equalizing dropping funnel, under nitrogen. The mixture was cooled down to 0° C. and freshly distilled undecenoyl chloride (6.04 g, 29.8 mmol) was added via the dropping funnel over one hour. A precipitate (triethylamonium chloride salt) formed. The resulting mixture was stirred overnight at room temperature and poured into dilute aqueous hydrochloric acid (0.1 M, 200 mL). The organic phase was then extracted with water (3×100 mL), dried with magnesium sulfate, filtered and the solvent evaporated off. Chromatography (silica gel, petroleum ether/ethyl acetate 90/10) and recrystallization from hexane afforded white crystals (6.86 g, 77%). Mp 57-58° C.; IR (NaCl, cm$^{-1}$) 2928, 2855, 1739, 1641, 1451, 1380, 1242, 1163, 1117, 1097, 1065, 993, 909 and 724; $^1$H NMR (CDCl$_3$, ppm) δ 5.78 (2H; m; CH=C), 4.96 (4H; m; CH$_2$=C), 4.73 (1H; m; H-3), 4.27 (4H; s; CH$_2$OCO), 2.39-2.13 (6H; mm; CH$_2$COO), 1.99-0.96 (54H; mm), 0.92 (3H; s; 21-CH$_3$), 0.90 (3H; s; 19-CH$_3$) and 0.64 (3H; s; 18-CH$_3$); $^{13}$C NMR (CDCl$_3$, ppm) δ 12.02, 18.24, 20.81, 23.32, 24.16, 24.86, 25.05, 26.31, 26.67, 27.01, 28.17, 28.87, 29.03, 29.05, 29.07, 29.17, 29.19, 29.26, 30.90, 31.09, 32.28, 33.76, 34.11, 34.58, 34.75, 35.03, 35.33, 35.77, 40.12, 40.38, 41.88, 42.72, 55.99, 56.46, 61.98, 61.99, 74.03, 114.11, 114.14, 139.09, 139.13, 173.37, 173.53 and 173.97 (44 obs, 48 req); MS (electrospray) 775.5825, C$_{48}$H$_{80}$O$_6$Na$^+$ requires 775.5853; elemental analysis: calc: C, 76.5%, H, 10.7%; found: C, 76.8%, H, 11.0%.

Diene 6. This compound was prepared, following a similar procedure as for diene 5a, from w-undecylenyl lithocholate 4 (12.00 g, 22.7 mmol), DCM (anhydrous, 150 mL), triethylamine (freshly distilled, 5.2 mL, 37.4 mmol) and freshly distilled undecenoyl chloride (5.7 g, 28.0 mmol). Chromatography (silica gel, petroleum ether/ethyl acetate 95/5) and recrystallization from hexane afforded white crystals (12.93 g, 82%). Mp 46-47° C.; IR (NaCl, cm$^{-1}$) 3076, 2927, 2855, 1736, 1641, 1467, 1452, 1381, 1357, 1244, 1172, 1097, 992 and 908; $^1$H NMR (CDCl$_3$, ppm) δ 5.80 (2H; m; CH=C), 4.95 (4H; m; CH$_2$=C), 4.72 (1H; m; H-3), 4.05 (2H; t, J=7 Hz; CH$_2$OCO), 2.38-2.13 (4H; mm; CH$_2$COO), 2.08-0.94 (56H; mm), 0.93 (3H; s; 21-CH$_3$), 0.90 (3H; s; 19-CH$_3$) and 0.64 (3H; s; 18-CH$_3$); $^{13}$C NMR (CDCl$_3$, ppm) δ 12.45, 18.67, 21.24, 23.75, 24.60, 25.49, 26.35, 26.75, 27.10, 27.44, 28.60, 29.06, 29.30, 29.33, 29.46, 29.51, 29.52, 29.60, 29.64, 29.69, 29.81, 29.87, 30.72, 31.46, 31.76, 32.71, 34.20, 34.21, 35.01, 35.18, 35.47, 35.76, 36.21, 40.56, 40.82, 42.32, 43.14, 56.45, 56.90, 64.82, 74.47, 114.55, 139.58, 139.59, 173.82 and 174.82 (46 obs, 46 req); MS (electrospray) 695.5955, C$_{46}$H$_{78}$O$_4$H$^+$ requires 695.5978; elemental analysis: calc: C, 79.5%, H, 11.3%; found: C, 79.2%, H, 12.3%.

Cyclic Bile Acid 7a. Diene 5a (10.00 g, 13.3 mmol) and DCM (anhydrous, 1.5 L) were placed in a flame-dried round-bottom flask (2-neck, 2 L), under argon atmosphere. The resulting mixture was degassed with argon for 2 h and a solution of benzylidene-bis(tricyclohexylphosphine) dichlororuthenium (Grubbs' catalyst 1$^{st}$ generation) (546 mg, 6.64.10$^{-4}$ mol) in DCM (anhydrous, argon degassed, 50 mL) was added. Stirring at room temperature was continued for 24 h and ethylvinyl ether (5 mL, excess) was added in order to quench the catalyst. After stirring for a further 3 h, the solvent was evaporated off and the resulting dark brown oil was purified by chromatography (silica gel, petroleum ether/ethyl acetate 90/10) to afford a white solid (7.06 g, 73%). T$_m$ (DSC) 94.7° C.; IR (NaCl, cm$^{-1}$) 2927, 2855, 1738, 1450, 1378, 1245, 1162, 1096, 1061, 1018 and 966; $^1$H NMR (CDCl$_3$, ppm) δ 5.37 (2H; mm; CH=), 4.74 (1H; m; H-3), 4.28 (4H; m; CH$_2$OCO), 2.42-2.17 (6H; mm; CH$_2$COO), 2.06-0.97 (54H; mm), 0.93 (3H; s; 21-CH$_3$), 0.92 (3H; s; 19-CH$_3$) and 0.65 (3H; s; 18-CH$_3$); $^{13}$C NMR (CDCl$_3$, ppm) δ 12.38, 18.59, 21.17, 23.67, 24.51, 25.22, 25.41, 26.66, 27.03, 27.36, 28.51, 29.22, 29.37, 29.42, 29.46, 29.54, 29.58, 29.65, 29.96, 31.25, 31.47, 32.64, 32.93, 34.11, 34.46, 34.91, 34.93, 35.10, 35.15, 35.38, 35.68, 36.13, 40.48, 40.74, 42.24, 43.07, 56.38, 56.81, 62.32, 62.52, 74.39, 130.64, 130.68, 173.73, 173.90 and 174.33 (46 obs, 46 req); MS (MALDI-TOF) 747.50 g·mol$^{-1}$, C$_{46}$H$_{76}$O$_6$Na$^+$ requires 747.55 g·mol$^{-1}$; elemental analysis: calc: C, 76.2%, H, 10.6%; found: C, 75.8%, H, 10.9%.

Cyclic Bile Acid 8. The title compound was prepared, following a similar procedure as for cyclic bile acid 7a, from diene 6 (3.50 g, 6.15 mmol), benzylidene-bis(tricyclohexylphosphine) dichlororuthenium (Grubbs' catalyst 1$^{st}$ generation) (253 mg, 3.08.10$^{-4}$ mol) and DCM (anhydrous, 500 mL). Chromatography (silica gel, petroleum ether/ethyl acetate 95/5) afforded a white solid (2.42 g, 59%). T$_m$ (DSC) 119.6° C.; IR (NaCl, cm$^{-1}$) 2927, 2855, 1734, 1465, 1451, 1381, 1355, 1247, 1170, 1094, 1021, 992 and 967; $^1$H NMR (CDCl$_3$, ppm) δ 5.39 (2H; mm; CH=), 4.73 (1H; m; H-3), 4.07 (2H; m; CH$_2$OCO), 2.39-2.13 (4H; mm; CH$_2$COO), 2.08-0.98 (56H; mm), 0.93 (3H; s; 21-CH$_3$), 0.92 (3H; s; 19-CH$_3$) and 0.65 (3H; s; 18-CH$_3$); $^{13}$C NMR (CDCl$_3$, ppm) δ 12.35, 18.64, 21.22, 23.66, 24.48, 25.59, 26.59, 26.62, 26.94, 27.28, 28.57, 29.04, 29.10, 29.16, 29.39, 29.56, 29.63, 29.65, 29.82, 29.83, 29.87, 31.04, 31.47, 32.55, 32.98, 33.02, 34.85, 35.35, 35.44, 35.50, 36.05, 40.55, 40.87, 42.14, 43.00, 43.03, 55.49, 57.05, 64.72, 74.34, 130.60, 130.66, 173.83 and 174.92 (44 obs, 44 req); MS (MALDI-TOF) 689.63, C$_{44}$H$_{74}$O$_4$Na$^+$ requires 689.55; elemental analysis: calc: C, 79.2%, H, 11.3%; found: C, 79.0%, H, 12.1%.

ED-ROMP GENERAL PROCEDURE. Polymer 1a. Cyclic bile acid 7a (251 mg, 3.46.10$^{-4}$ mol) and DCM (anhydrous, degassed with argon for one hour, 2.8 mL) were placed in a flame-dried round-bottomed flask (1-neck, 10 mL) under argon. A solution of [1,3-bis-(2,4,6-trimethylphenyl)-2-imidazolidinylidene)dichloro(phenylmethylene)-tricyclohexylphosphine)ruthenium] (Grubbs' catalyst 2$^{nd}$ generation) in DCM (191 μL of a solution of 7.7 mg, 9.07.10$^{-6}$ mol, in 0.5 mL degassed anhydrous DCM, amounting to 1 mol % with respect to the monomer) was added via a septum. The mixture was left to react at room temperature for three hours. The vigorously stirred solution rapidly became very viscous. Ethyl vinyl ether (0.1 mL) was added in order to quench the catalyst and the resulting mixture was stirred for a further hour. DCM (7 mL) were added and the resulting viscous solution was precipitated in a hexane/methanol 2/1 mixture (200 mL). The colourless gum that precipitated was filtered off, quickly dried in vacuum, dissolved in DCM (10 mL) and precipitated in a hexane/methanol 2/1 mixture (200 mL). Filtration and drying in vacuum for one day afforded a colourless gum (178 mg, 71%). DSC: T$_g$: 2.3° C.; TGA: T$_{dec}$: 348° C.; IR (NaCl, cm$^{-1}$) 2927, 2854, 1739, 1453, 1380, 1243, 1163, 1122, 1097, 1065, 967, 930 and 737; $^1$H NMR (CDCl$_3$, ppm) δ 5.35 (2H; m; CH=), 4.72 (1H; m; H-3), 4.26 (4H; s;

CH$_2$OCO), 2.41-2.12 (6H; mm; CH$_2$COO), 2.06-0.96 (54H; mm̄), 0.92 (3H; s; 21-CH$_3$), 0.90 (3H; s; 19-CH$_3$) and 0.64 (3H; s; 18-CH$_3$); $^{13}$C NMR (CDCl$_3$, ppm) δ 12.03, 18.25, 20.82, 23.33, 24.18, 24.78, 24.87, 25.06, 26.32, 26.69, 27.02, 27.20, 28.18, 29.12, 29.24, 29.32, 29.63, 30.90, 31.14, 32.30, 32.59, 34.11, 34.59, 34.75, 35.05, 35.35, 35.79, 40.13, 40.39, 41.90, 42.73, 56.05, 56.46, 62.00, 74.04, 130.30, 173.39, 173.55 and 173.97 (39 obs, 46 req); SEC (THF) M$_n$ 130,000; M$_w$ 234,000; elemental analysis: calc for (C$_{46}$H$_{76}$O$_6$)$_n$: C, 76.2%, H, 10.6%; found: C, 75.5%, H, 11.5%.

Polymer 1e. The title polymer was prepared, following a similar procedure as for polymer 1a, from cyclic bile acid 8 (250 mg, 3.84.10$^{-4}$ mol), DCM (anhydrous, degassed with argon for one hour, 2.75 mL) and a solution of [1,3-bis-(2,4,6-trimethylphenyl)-2-imidazolidinylidene)dichloro(phenylmethylene)-(tricyclohexylphosphine)ruthenium] (Grubbs' catalyst 2$^{nd}$ generation) in DCM (254 μL of a solution of 6.5 mg, 7.65.10$^{-6}$ mol, in 0.5 mL degassed anhydrous DCM, amounting to 1 mol % with respect to the monomer). This afforded a colourless gum (169 mg, 68%). DSC: T$_g$: 14.6° C.; TGA: T$_{dec}$: 367° C.; IR (NaCl, cm$^{-1}$) 2927, 2854, 1735, 1453, 1381, 1357, 1244, 1171, 1096, 1021 and 967; $^1$H NMR (CDCl$_3$, ppm) δ 5.38 (2H; m; CH=), 4.72 (1H; m; H-3), 4.04 (2H; t, J=7 Hz; CH$_2$OCO), 2.39-2.15 (4H; m; CH$_2$COO), 2.05-0.95 (54H; mm̄), 0.92 (3H; s; 21-CH$_3$), 0.90 (3H; s; 19-CH$_3$) and 0.64 (3H; s; 18-CH$_3$); $^{13}$C NMR (CDCl$_3$, ppm) δ 12.39, 18.62, 21.18, 23.00, 23.69, 24.54, 25.42, 26.29, 26.68, 27.04, 27.38, 28.53, 29.01, 29.46, 29.48, 29.52, 29.60, 29.67, 29.78, 29.85, 29.98, 30.01, 31.39, 31.73, 32.66, 32.95, 32.96, 34.95, 35.11, 35.40, 35.71, 36.15, 40.49, 40.75, 42.26, 43.08, 56.43, 56.82, 64.77, 74.42, 130.68, 173.77 and 174.75 (43 obs, 44 req); SEC (THF) M$_n$ 168,300; M$_w$ 295,300; elemental analysis: calc for (C$_{44}$H$_{74}$O$_4$)$_n$: C, 79.2%, H, 11.2%; found: C, 77.7%, H, 12.0%.

Polymerization of diene 1a via ADMET. Diene 5a (0.50 g, 6.6.10$^{-4}$ mol) and DCM (anhydrous, degassed with argon for one hour, 3 mL) were placed in a flame-dried round-bottomed flask (1-neck, 10 mL) under argon. The resulting mixture was further degassed with argon for 15 min and a solution of Grubbs' catalyst (1$^{st}$ generation) in degassed DCM (27 mg, 3.32.10$^{-5}$ mol in 0.5 mL DCM) was added via a septum. The mixture was left to react at room temperature for three hours with cycles of vacuum and argon every 30 min and another load of catalyst (27 mg, 3.32.10$^{-5}$ mol in 0.5 mL degassed DCM) was added, as well as freshly degassed DCM (2 mL). The resulting mixture was left to react for another three hours with cycles of vacuum and argon every 30 min. Ethyl vinyl ether (0.1 mL) and DCM (10 mL) were added and the mixture stirred in air for one hour, passed through a silica plug (eluted with petroleum ether/ethyl acetate 75/25), the solvent concentrated to 10 mL, added into hexane (100 mL), filtered and dried under vacuum for one day. This afforded a dark rubbery solid (249 mg, 52%). Similar $^1$H NMR and IR spectra as for polymer 3 synthesized via ED-ROMP were obtained; SEC (THF, g·mol$^{-1}$) M$_n$ 20,300; M$_w$ 38,800; elemental analysis: calc: C, 76.2%, H, 10.6%; found: C, 75.9%, H, 11.1%.

Figure 4:
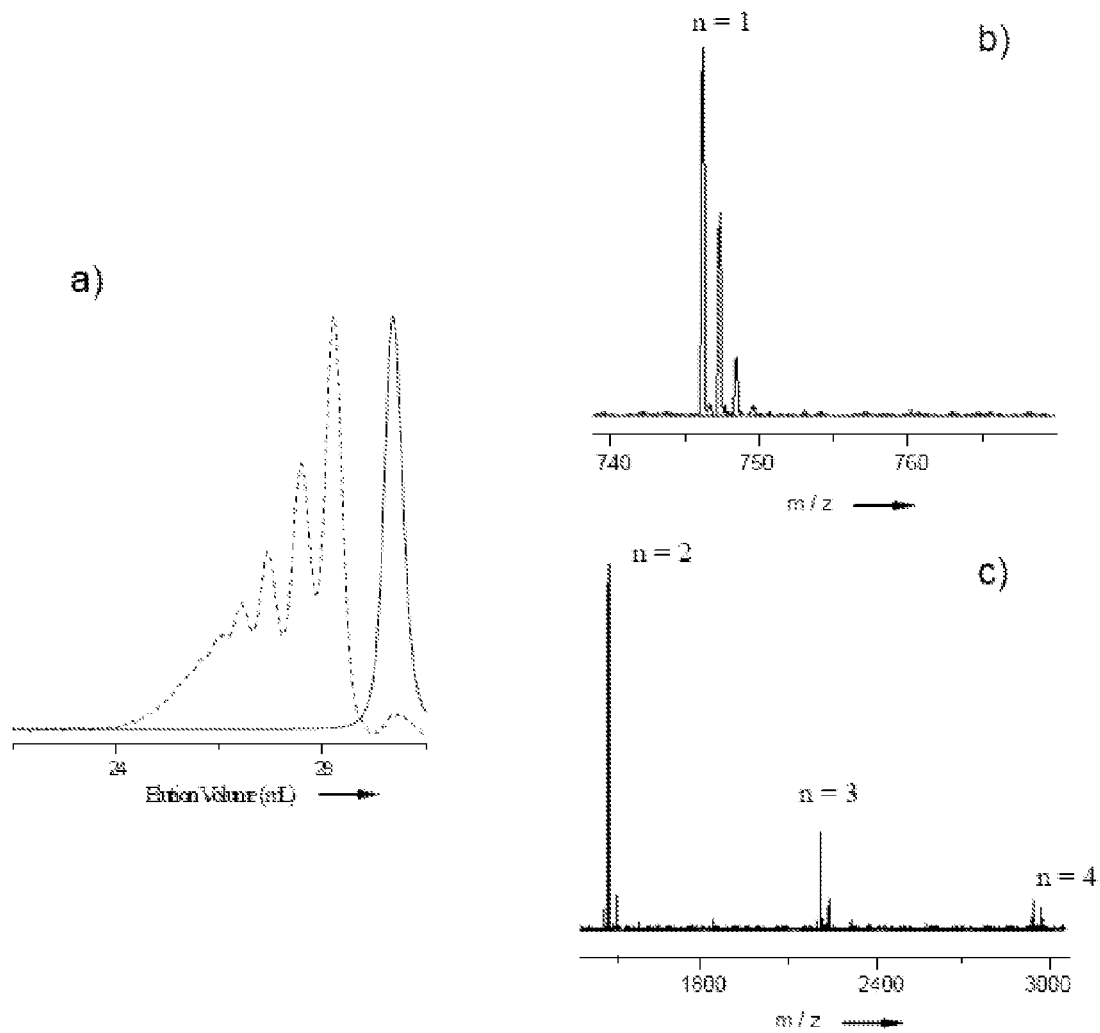

FIG. 4 shows the GPC traces (A) obtained for cyclic monomer 7a (solid line) and oligomers (dashed line); eluent is THF and MALDI-TOF spectra obtained for cyclic monomer 7a (B) and oligomers (C).

Figure 5:
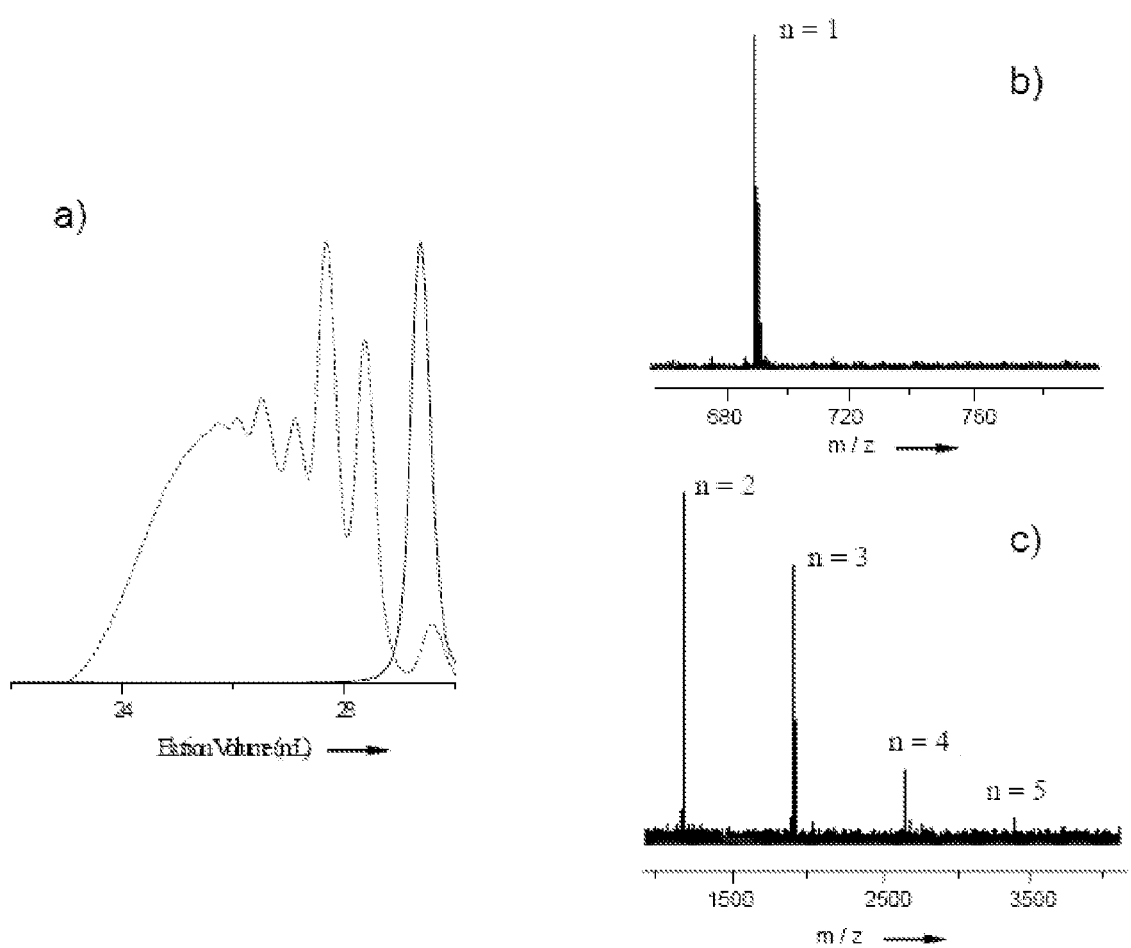
FIG. 5 shows the characterization of cyclic oligomers prepared from diene 6.

FIG. 5 shows the GPC traces (A) obtained for cyclic monomer 8 (solid line) and oligomers (dashed line); eluent is THF and the MALDI-TOF spectra obtained for cyclic monomer 8 (B) and oligomers (C).

Figure 6:
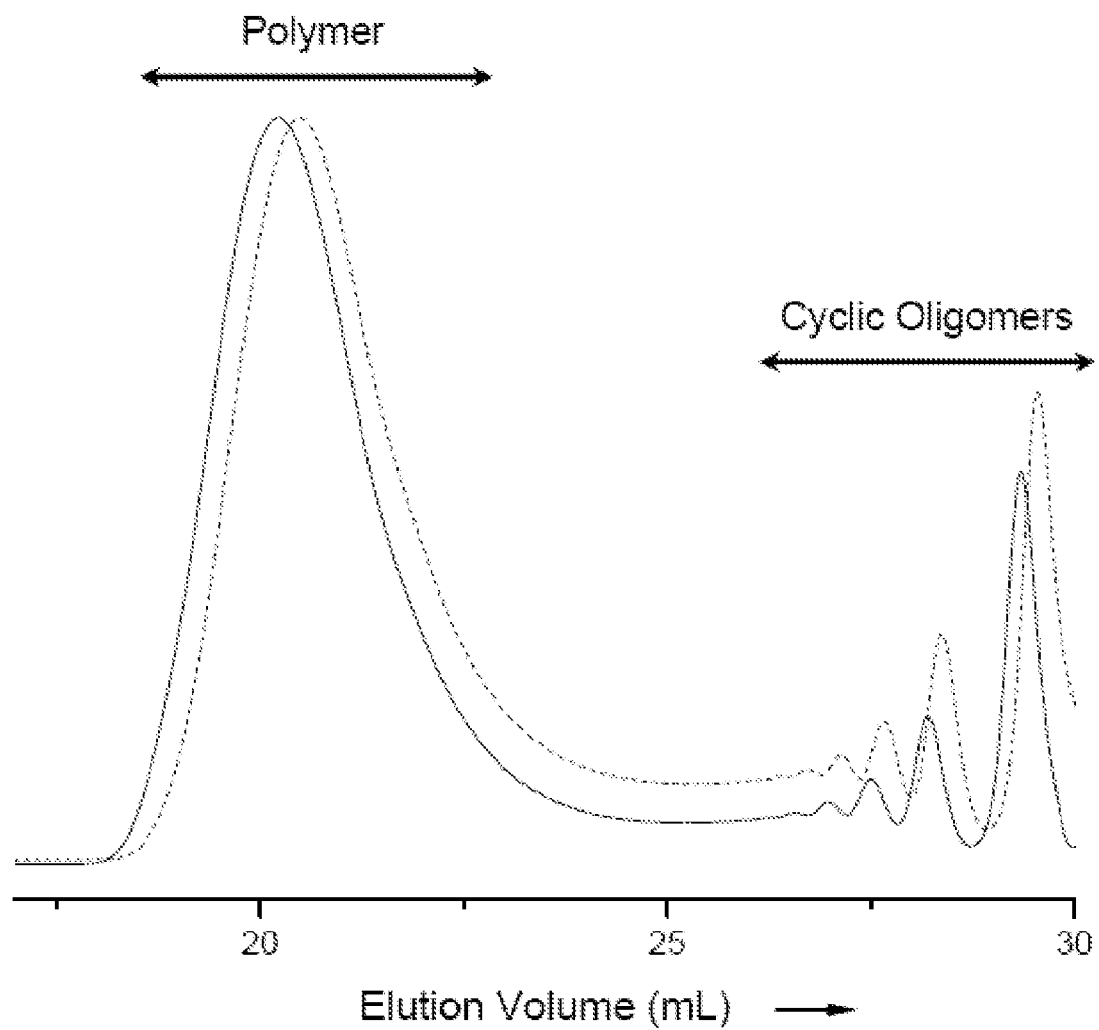
FIG. 6 shows the GPC traces of polymerization mixtures (fractions taken prior to precipitation) of polymer 1a (solid line) and 1e (dashed line)

FIG. 6 shows the GPC traces of polymerization mixtures (fractions taken prior to precipitation) of polymer 1a (solid line) and 1e (dashed line). Polymerizations were carried out at 0.12 and 0.13 mol·L-1 for 1a and 1e, respectively. Eluent is THF.

Figure 7:
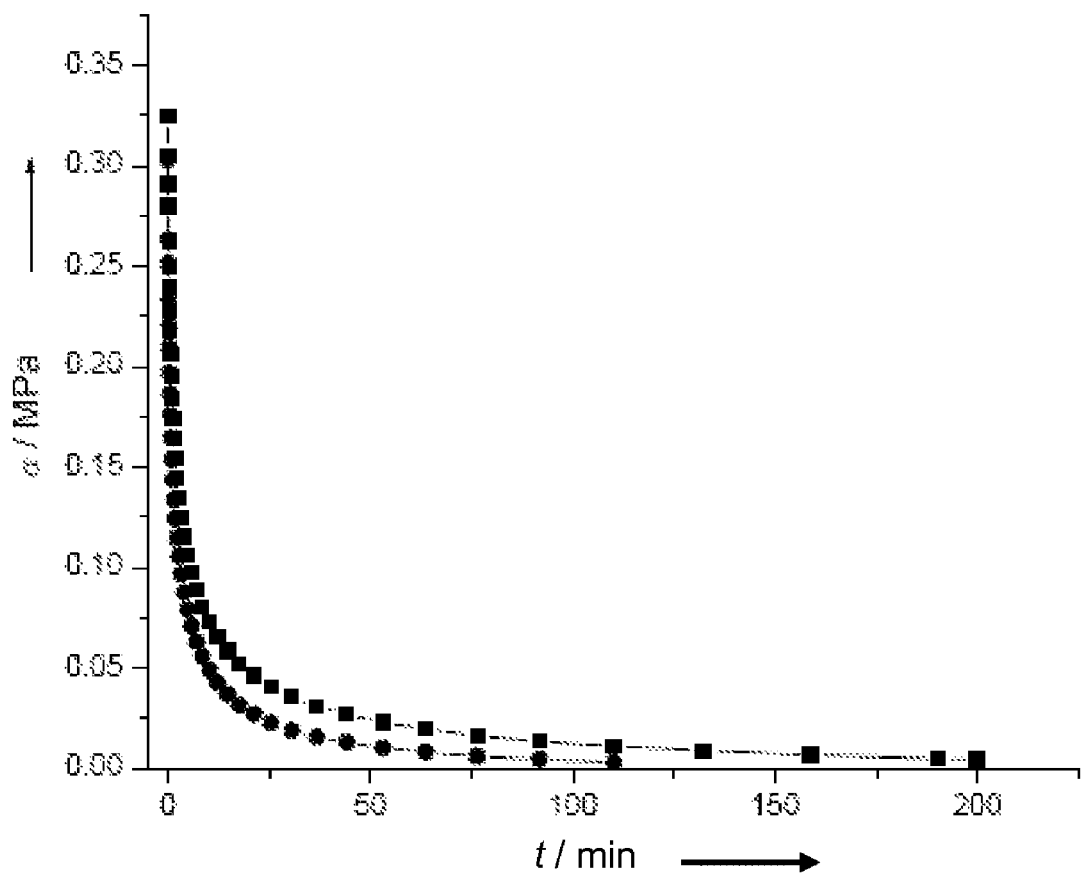
FIG. 7 shows the stress relaxation experiment carried out for polymers 1a (squares) and 1e (circles) at 40 and 50° C., respectively.

FIG. 7 shows the stress relaxation experiment carried out for polymers 1a (squares) and 1e (circles) at 40 and 50° C., respectively. Initial stress applied was 0.5 MPa in both cases.

Figure 8:
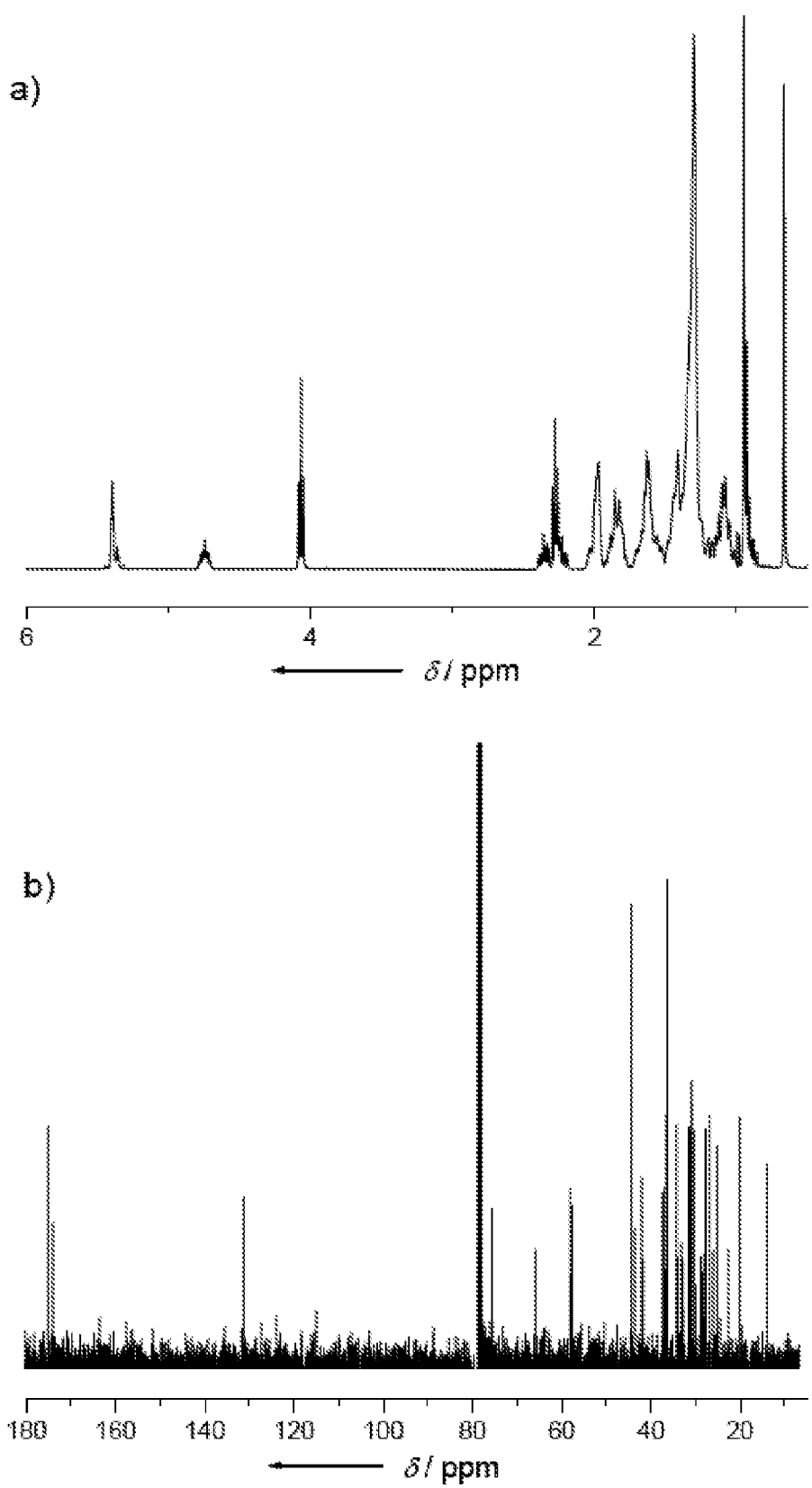
FIG. 8 shows the proton (a) and carbon (b) NMR spectra of polymer 1e in chloroform.

FIG. 8 shows the proton (a) and Carbon (b) NMR spectra of polymer 4 in chloroform.

Characterization of the Materials

Cyclic bile acids 7a (38-membered ring) and 8 (35-membered ring) were first synthesized (FIG. 2) in relatively high yields (73 and 59%, respectively) from their corresponding dienes, at high dilution. Cyclic oligomers were also formed during the reaction, which is in agreement with the Jacobson-Stockmayer theory [Jacobson et al., *Chem. Phys.* 1950, 18, 1600-1606] as evidenced by the above MALDITOF mass spectrometric analysis. Such high yields in cyclic monomers from an equilibrium reaction are clear indication of the flexibility introduced through the aliphatic chains and the extremely low strain of the macrocycles formed.

ED-ROMP of 7a and 8 at high concentrations using the highly efficient and stable second generation Grubbs catalyst afforded high-molecular-weight polymers in high yields after precipitation from methanol/hexane mixtures (see Table 1).

TABLE 1

ED-ROMP of macrocycles 7a and 8 based on bile acids with the 2nd generation Grubbs catalyst (1 mol %) at room temperature.

| Monomer | [Monomer] [M] | Conv. [%] | Cycl. olig./ poly.[a] | M$_n$ (×10$^3$)[b] | M$_w$ (×10$^3$)[b] |
|---|---|---|---|---|---|
| 7a | 1.07 | 98.2 | 2.4/97.6 | 151.5 | 266.5 |
| 7a | 0.23 | 95.9 | 5.8/94.2 | 73.1 | 121.7 |
| 7a | 0.12 | 94.3 | 8.5/91.5 | 63.8 | 112.0 |
| 8 | 0.77 | 98.6 | 1A/98.6 | 146.0 | 273.5 |
| 8 | 0.13 | 95.2 | 9.1/90.9 | 58.7 | 106.7 |

[a]Total cyclic oligomers/polymer ratio determined by GPC [Gosline et al., Philos. Trans R Soc. London 2002, 357, 121-132.]
[b]Molecular weights determined by GPC. [Molecular weights were obtained by GPC, with polystyrene standards used and a correction factor of 0.55, as determined by intrinsic molecular-weight analysis of a series of oligomers.]

Figure 9:
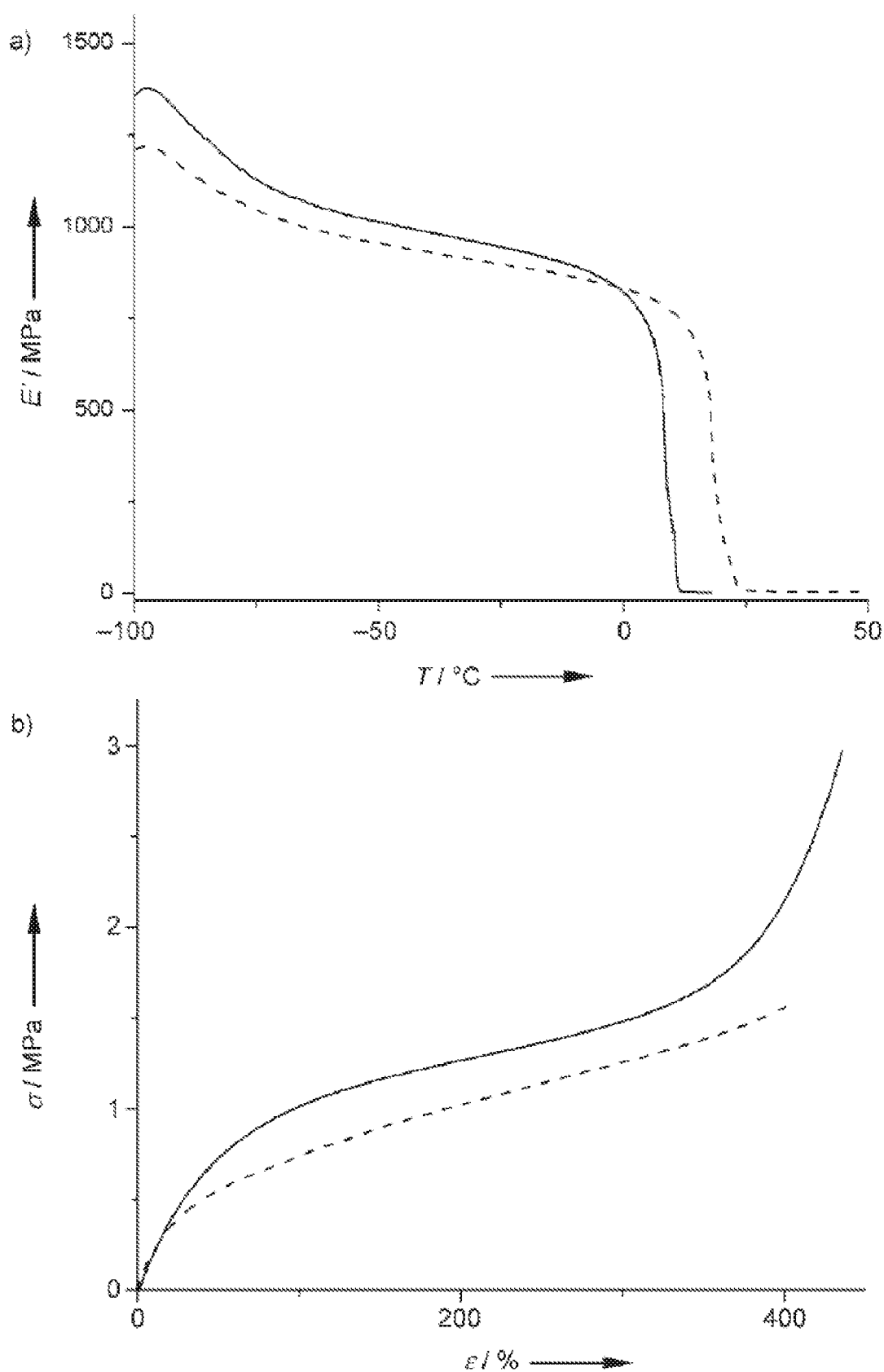
FIG. 9 shows the DMA results obtained for films of polymers 1a (solid line) and 1e (dashed line) prepared by evaporation of a $CH_2Cl_2$ solution (100 mgmL$^{-1}$) in a mold and subsequent drying in vacuo; a) multi-frequency experiments at 1 Hz; b) stress-strain curves obtained at 37° C. (maximal elongations correspond to travel limits of the equipment geometry rather than elongations at break)

Polymers 1a and 1e both display a glass transition temperature T$_g$ below room temperature (T$_g$=2.3+0.2 and 14.6+1.0° C. for 3 and 4, respectively) without any evidence of melting before decomposition starts to occur, as evidenced by differential scanning calorimetry (DSC). This fact, together with the transparency of films made from these polymers, suggests that these materials are amorphous. The glass transition of the polymer films was also measured by dynamic mechanical analysis (DMA) in the multifrequency mode (T$_g$=12.4±0.4 and 19.9±0.6° C. for 1a and 1e, respectively) (FIG. 9). Below these temperatures, the materials are relatively hard and brittle (E=531±107 and 672±150 MPa for 1a and 1e, respectively, at −10° C.), whereas above these temperatures, they display typical rubberlike elasticity (E=1.23±0.06 and 2.09±0.32 MPa for 1a and 1e, respectively, at 37° C.), with maximum elongations higher than 400% (geometrical limit of the equipment). 1a and 1e are thermoplastics and that their elasticity behavior is solely due to chain entanglement and weak physical cross-links, as demonstrated by stress-relaxation experiments, which clearly show that stress relaxes to zero over several hours. This property is an advantage over other thermoplastic degradable materials, since crystalline and amorphous domains are known to degrade at very different rates. [Cohn et al., *Biomaterials* 2005, 26, 2297-2305; Younes et al., *Biomaterials* 2004, 25, 5261-5269; and Amsden et al., *Biomacromolecules* 2004, 5, 2479-2486.]

In conclusion, ED-ROMP of macrocycles based on bile acids affords high-molecular-weight polyesters in high yields. The polymers obtained showed typical rubberlike elasticity and constitute the first family of degradable amorphous thermoplastics, with elongation moduli closely matching those of many soft tissues, such as elastic cartilage, aortic heart valves, and aorta. [Park et al., *Biomaterials: An Introduction,* 2nd ed., Plenum, N.Y., 1992]

The use of bile acids as rigid moieties provides low systemic toxicity and the high $pK_a$ value [A. F. Hofmann, A. Roda, *I. Lipid Res.* 1984, 25, 1477-1489.] of the ultimate degradation products released after complete hydrolysis of the two polymers synthesized, together with their high molar mass, ensures low inflammation response arising from a local decrease in the pH value, in contrast to the case observed for smaller acids such as lactic acid. [Fu et al., *Pharm. Res.* 2000, 17, 100-106.]

Results have shown that polymers 1a and 1e degrade slowly over a period of several months at 37° C. in phosphate-buffered saline solutions, as evidenced by weight loss and a decrease in the molecular weight.

Example 2

Figure 1:
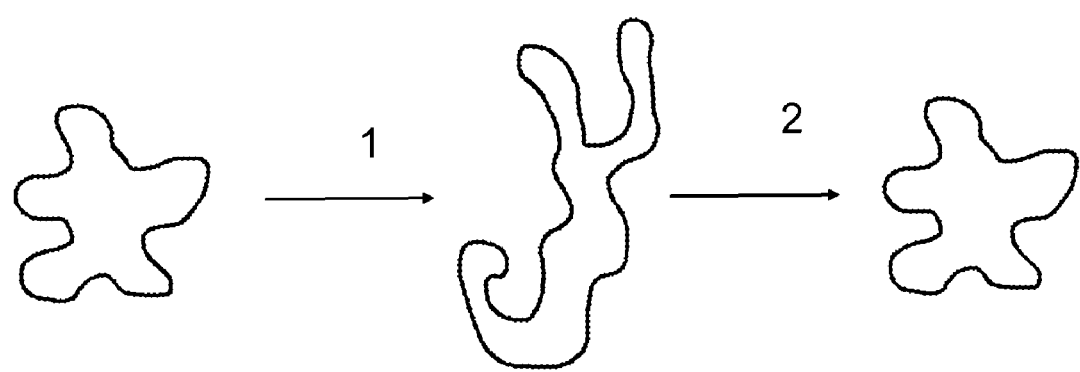
FIG. 1 is a schematic representation of shape memory effect.
Figure 2:
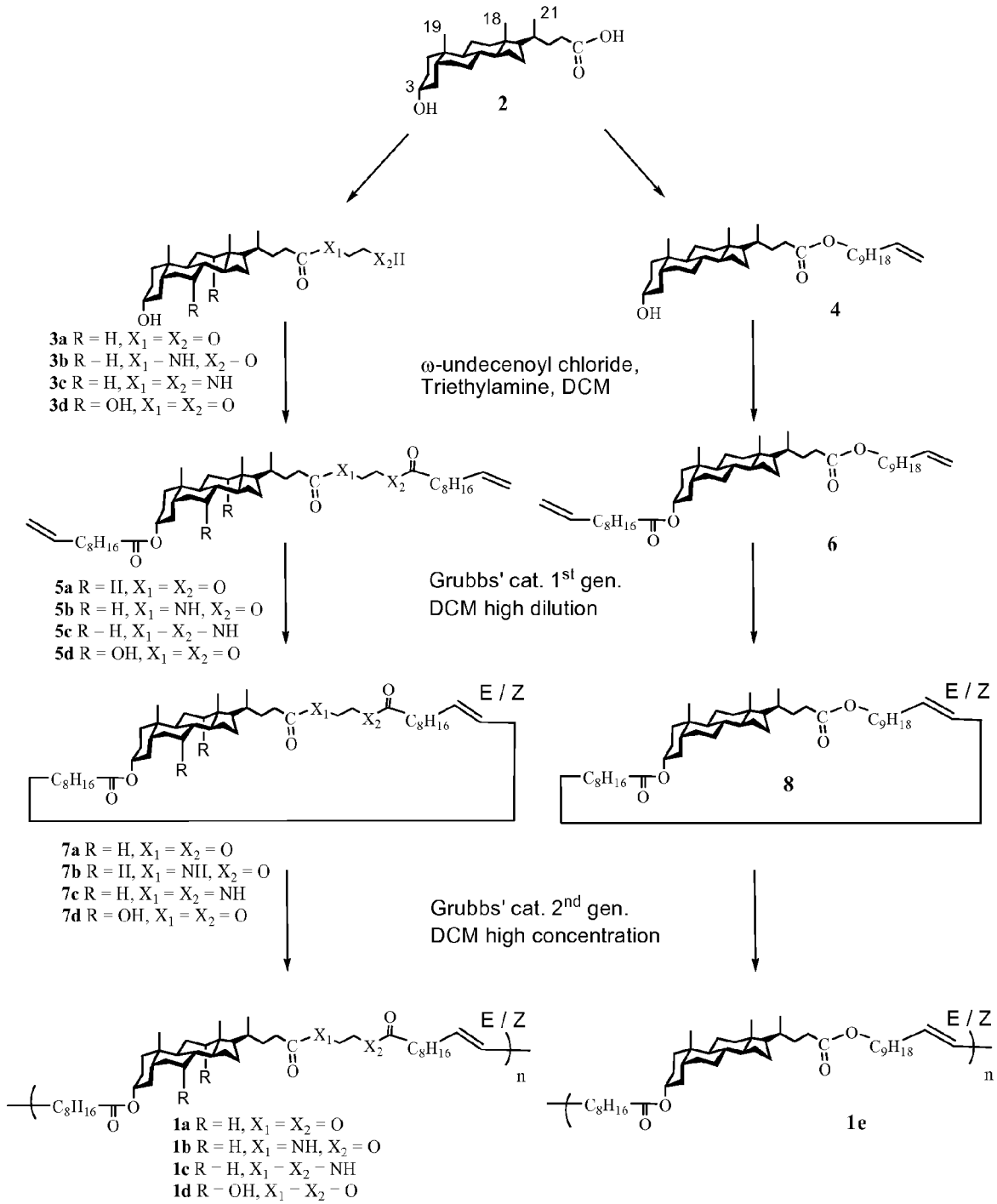
FIG. 2 shows the synthesis and structure of polymers 1a, 1b, 1c, 1d, and 1e.

Shape memory polymers 1a, 1b, 1c, 1d and 1e were synthesized according to the reaction scheme shown in FIG. 2.

These polymers had the following characteristics.

TABLE 2

Weight average molecular weight ($M_w$), glass transition temperature ($T_g$) and Young's modulus (E) of polymers 1a, 1b, 1c, 1d and 1e

| Polymer | $M_w \times 10^3$ | $T_g$ DMA (° C.) | E at 37.5° C. (Mpa) |
|---------|-------------------|------------------|---------------------|
| 1a | 452 | 12.4 ± 0.4 | 1.23 ± 0.06 |
| 1b | 397 | 49.3 ± 1.1 | 269 ± 97 |
| 1c | 400.5 | 63.2 ± 2.0 | 590 ± 98 |
| 1d | 319.2 | 48.2 ± 0.7 | 406 ± 88 |
| 1e | 278 | 19.9 ± 0.6 | 2.09 ± 0.32 |

TABLE 3

$R_r$ and $R_f$ values measured for 3 shape memory cycles in warm drawing mode.

| Polymer | $R_r(1)$ | $R_r(2)$ | $R_r(3)$ | $R_f(1)$ | $R_f(2)$ | $R_f(3)$ |
|---------|----------|----------|----------|----------|----------|----------|
| 1a | 98.8 ± 0.2 | 99.7 ± 0.4 | 99.9 ± 0.03 | 98.4 ± 0.1 | 98.2 ± 0.1 | 98.3 ± 0.3 |
| 1b | 97.4 ± 1.0 | 98.9 ± 0.7 | 99.5 ± 0.2 | 98.1 ± 0.2 | 98.1 ± 0.2 | 98.0 ± 0.2 |
| 1c | 95.3 ± 2.4 | 96.2 ± 2.3 | 95.9 ± 1.8 | 95.7 ± 0.7 | 95.6 ± 0.5 | 95.9 ± 1.4 |
| 1d | 95.4 ± 1.9 | 98.7 ± 0.7 | 99.5 ± 0.2 | 94.6 ± 2.0 | 94.2 ± 1.8 | 93.6 ± 2.0 |
| 1e | 97.8 ± 0.6 | 99.1 ± 0.5 | 99.8 ± 0.4 | 97.9 ± 0.1 | 97.9 ± 0.2 | 97.9 ± 0.2 |

TABLE 4

$R_r$ and $R_f$ values measured for 3 shape memory cycles in cold drawing mode.

| Polymer | $R_r(1)$ | $R_r(2)$ | $R_r(3)$ | $R_f(1)$ | $R_f(2)$ | $R_f(3)$ |
|---------|----------|----------|----------|----------|----------|----------|
| 1a | 95.7 ± 0.9 | 99.2 ± 0.2 | 99.5 ± 0.2 | 80.4 ± 2.7 | 79.9 ± 2.3 | 79.5 ± 2.2 |
| 1b | 95.2 ± 0.7 | 97.6 ± 1.3 | 98.7 ± 0.3 | 74.3 ± 3.2 | 72.9 ± 2.7 | 71.4 ± 1.9 |
| 1c | 93.9 ± 1.3 | 98.6 ± 0.9 | 99.7 ± 0.4 | 75.3 ± 3.5 | 76.5 ± 2.8 | 77.8 ± 2.4 |
| 1d | 95.3 ± 1.1 | 99.0 ± 0.6 | 99.6 ± 0.2 | 59.2 ± 2.4 | 56.1 ± 3.8 | 56.1 ± 3.0 |
| 1e | 95.8 ± 0.6 | 99.5 ± 0.5 | 99.6 ± 0.2 | 79.7 ± 1.1 | 78.9 ± 1.2 | 78.6 ± 0.9 |

Example 3

Figure 10:
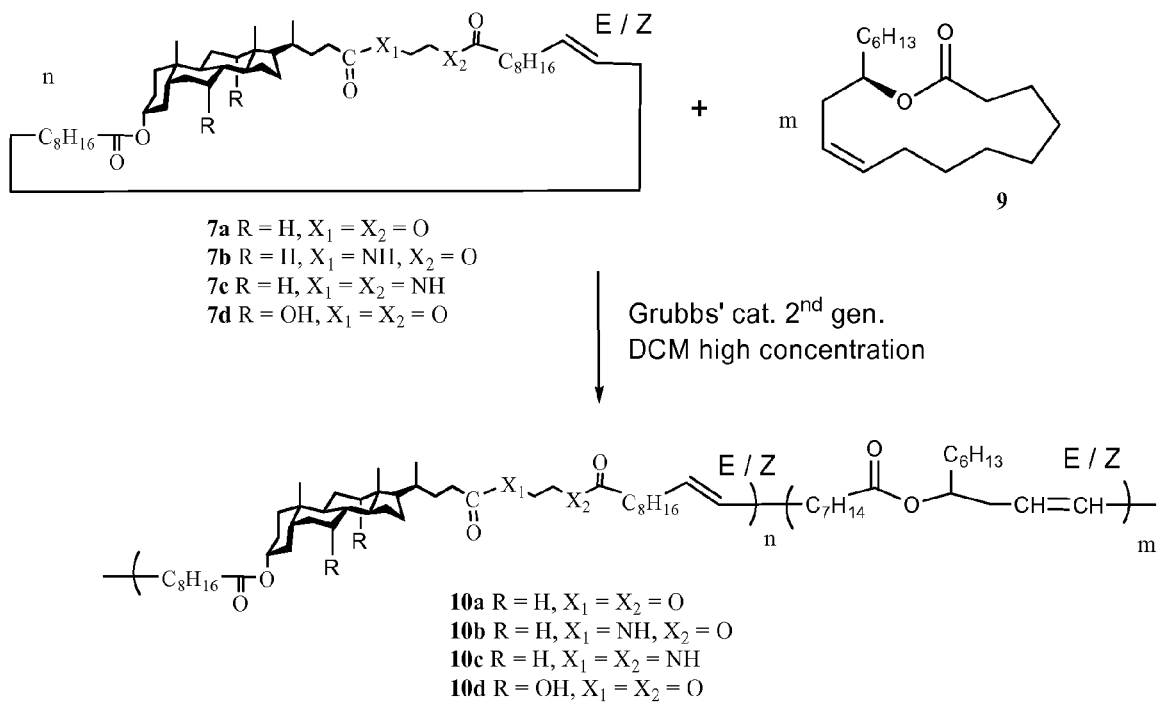
FIG. 10 shows the synthesis and structure of polymers 10a, 10b, 10c and 10d.

Shape memory polymers 10b, 10c, and 10d were synthesized according to the reaction scheme shown in FIG. 10, wherein molar ratios n and m are 0.81 and 0.19; 0.63 and 0.37; and 0.84 and 0.16 for polymers 10b, 10c and 10d, respectively.

These polymers had the following characteristics.

TABLE 5

Weight average molecular weight (Mw), glass transition temperature ($T_g$) and Young's modulus (E) of polymers 1a, 1b, 1c, 1d and 1e.

| Polymer | $M_w \times 10^3$ | $T_g$ DMA (° C.) | E at 37.5° C. (Mpa) |
|---------|-------------------|------------------|---------------------|
| 10b | 414 | 34.4 ± 0.4 | 5.83 ± 1.02 |
| 10c | 404.3 | 41.5 ± 4.9 | 75.4 ± 29.7 |
| 10d | 270 | 34.2 ± 0.8 | 19.6 ± 4.2 |

TABLE 6

$R_r$ and $R_f$ values measured for 3 shape memory cycles in warm drawing mode.

| Polymer | $R_r(1)$ | $R_r(2)$ | $R_r(3)$ | $R_f(1)$ | $R_f(2)$ | $R_f(3)$ |
|---------|----------|----------|----------|----------|----------|----------|
| 10b | 97.1 ± 1.4 | 99.5 ± 0.2 | 99.4 ± 0.4 | 94.9 ± 1.1 | 94.4 ± 1.6 | 94.7 ± 1.2 |
| 10c | 89.7 ± 1.4 | 94.6 ± 0.4 | 97.1 ± 0.3 | 92.1 ± 1.6 | 90.7 ± 1.8 | 90.1 ± 2.0 |
| 10d | 96.5 ± 3.5 | 99.0 ± 0.7 | 99.6 ± 0.1 | 91.8 ± 3.5 | 91.4 ± 2.0 | 90.7 ± 2.4 |

TABLE 7

R$_r$ and R$_f$ values measured for 3 shape memory cycles in cold drawing mode.

| Polymer | R$_r$(1) | R$_r$(2) | R$_r$(3) | R$_f$(1) | R$_f$(2) | R$_f$(3) |
| --- | --- | --- | --- | --- | --- | --- |
| 10b | 93.5 ± 1.1 | 96.3 ± 0.9 | 98.7 ± 0.3 | 71.6 ± 4.3 | 68.0 ± 2.5 | 67.3 ± 2.3 |
| 10c | 95.3 ± 1.3 | 95.8 ± 1.3 | 98.3 ± 0.9 | 60.9 ± 1.2 | 60.7 ± 1.1 | 59.0 ± 1.1 |
| 10d | 94.7 ± 0.8 | 98.2 ± 0.9 | 99.3 ± 0.5 | 64.4 ± 2.0 | 65.5 ± 3.9 | 65.6 ± 2.9 |

Example 4

Figure 11:
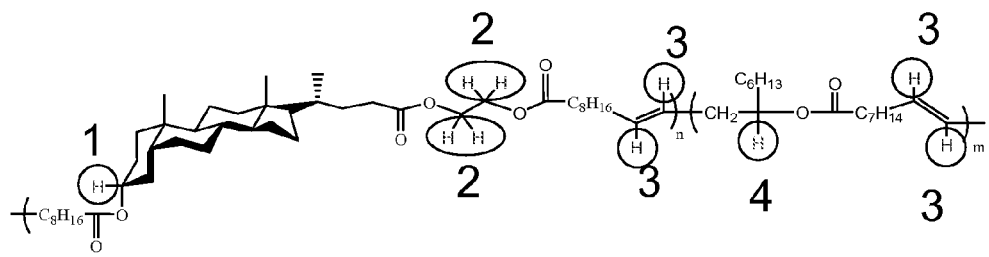
Figure 12:
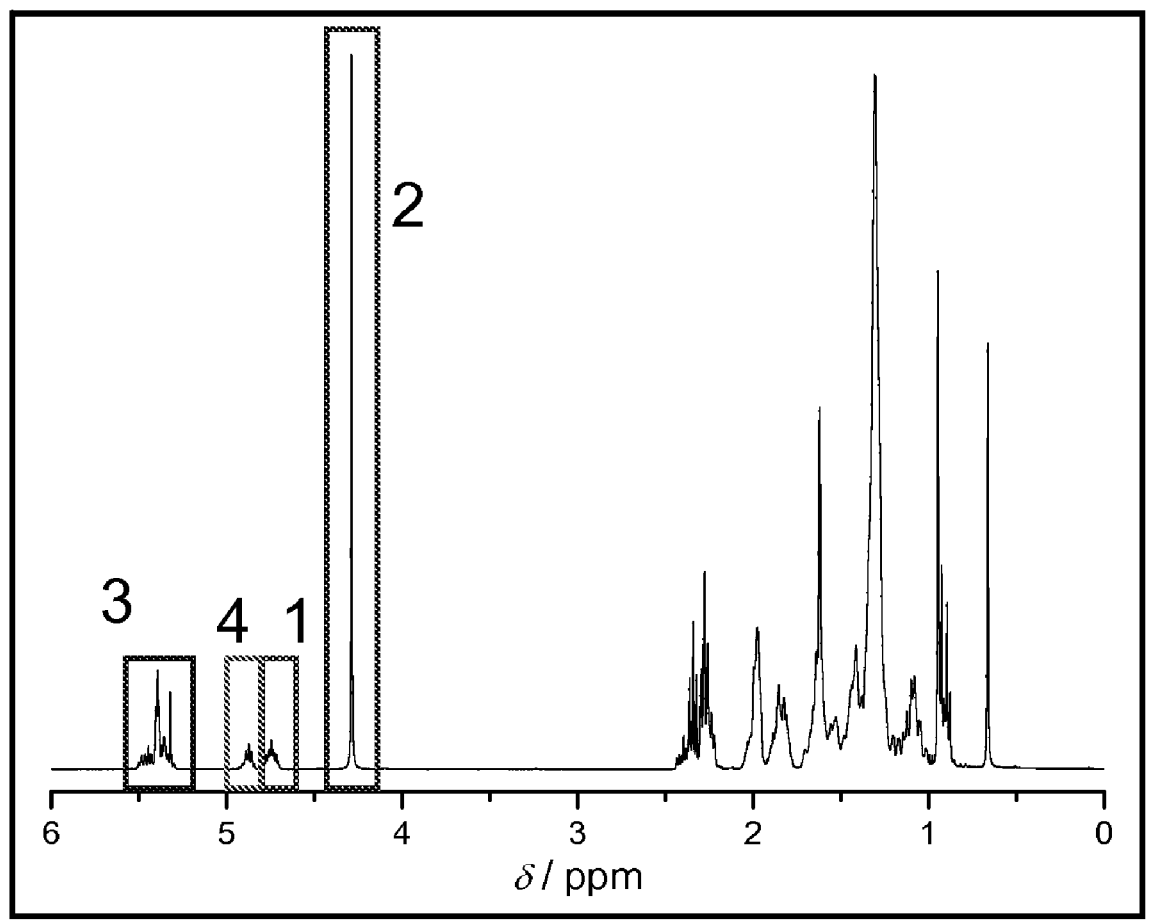

Polymer 10a (illustrated on FIG. 11) was also synthesized according to the reaction scheme of FIG. 10. The numbers in FIG. 11 correspond to the different peaks associated with the H atoms in the proton NMR spectra shown in FIG. 12.

Figures 13, 14:
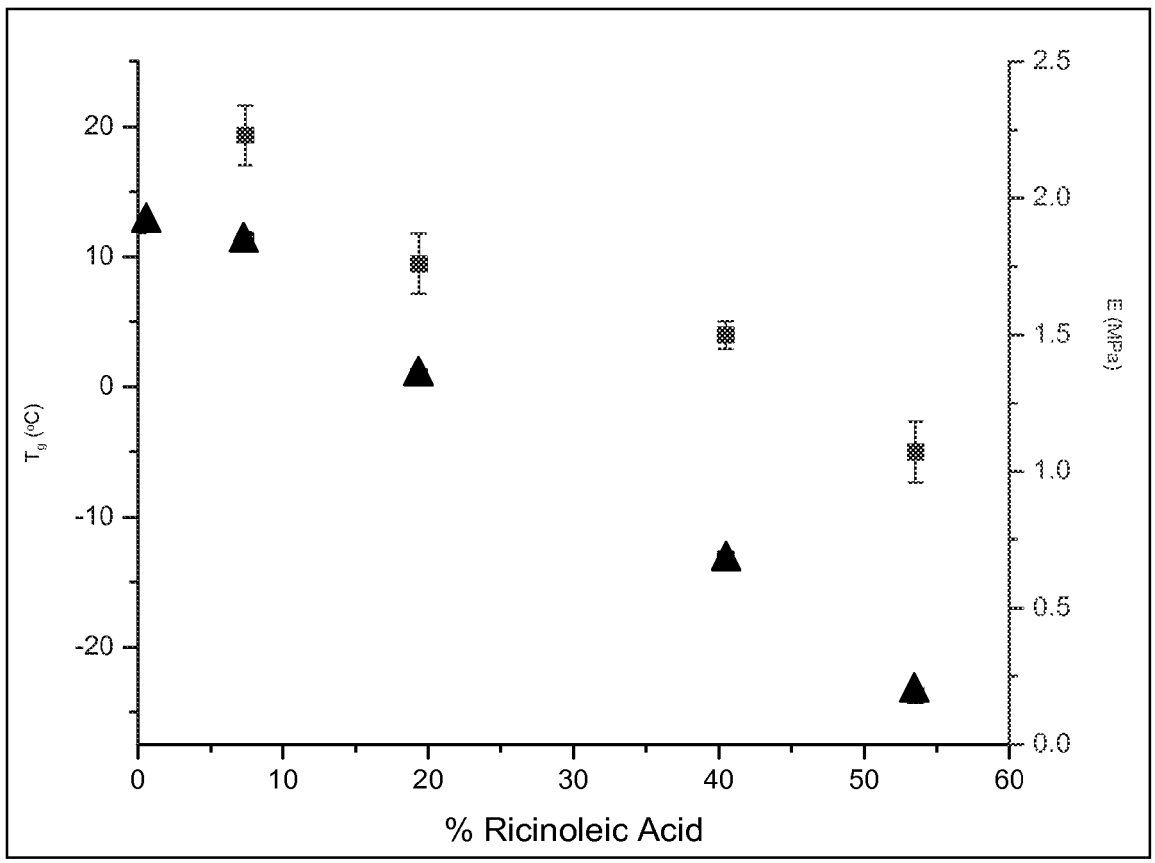
FIG. 13 shows the effect of the composition of polymer 10a on its glass transition temperature (triangles) and the Young Modulus (square)
FIG. 14 shows the equations that can be used to calculate the glass transition of a polymer of the invention.

FIG. 13 shows the effect of the composition of the polymer on its glass transition temperature (triangles) and the Young Modulus (square). Polymers 10a with four different (m,n) values were synthesized: (0.074; 0.926), (0.194; 0.806), (0.405; 0.595), (0.536; 0.464).

FIG. 14 shows the equations that can be used to calculate the glass transition of the polymer obtained starting with the glass transition of homopolymer of each of its segments.

Discussion of the Examples

The polymers of the above examples have several interesting properties.

Shape Memory Effect.

Polymers based on bile acids, such as 1a-e and 10a-d, display shape memory effects both in warm and cold drawing modes.

In the warm drawing mode, the material is given its temporary shape above its transition temperature T$_{trans}$ and then quenched below T$_{trans}$ to fix their temporary shape. Shape recovery occurs upon heating the samples (different types of heating may be used at this point) above their T$_{trans}$.

Figure 15:
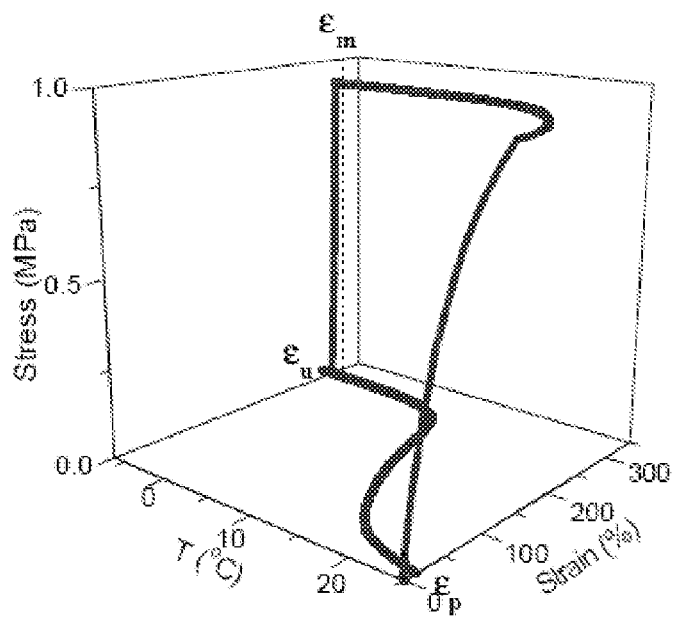
FIG. 15 shows the stress curves as a function of temperature and strain of polymer 1a in warm drawing mode.
Figure 16:
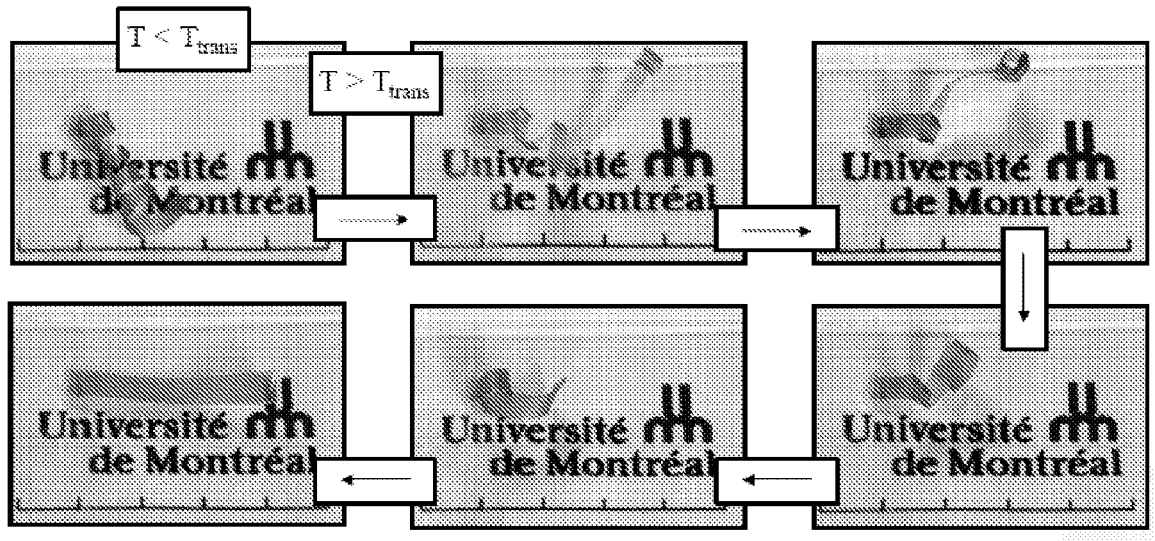
FIG. 16 shows pictures of the shape memory effect of polymer 1e in warm drawing mode.

FIGS. 15 and 16 shows the shape memory effect of polymer 1a and 1e in warm drawing mode. FIG. 15 shows stress curves as a function of temperature and strain for polymer 1a. From this figure, it is possible to calculate the strain recovery $$\left(R_r = \frac{\varepsilon_m - \varepsilon_p}{\varepsilon_m}\right)$$

and the fixed recovery $$\left(R_f = \frac{\varepsilon_u}{\varepsilon_m}\right),$$

which are indicative of the ability of the material to recover its original shape and to retain the temporary shape (until heating), respectively. For polymers 1a and 1e of Example 1 above, R$_r$ was 98.8±0.2% and 97.8±0.6%, and R$_f$ were 98.4±01% and 97.9±0.1%, respectively. These values demonstrate the very good shape memory effect of these polymers in warm drawing mode.

FIG. 16 shows pictures of this shape memory effect. The temporary shape of the polymer (1e) was a spring while its original shape was a stripe. As can be seen, the polymer fully recovered its original shape upon heating above its transition temperature.

In the cold drawing mode, the material is given its temporary shape below T$_{trans}$ and fixes it as soon as the stress applied is released. There is no need for quenching, which decreases the number of programming steps. Recovery occurs by simply heating the sample above T$_{trans}$.

Figure 17:
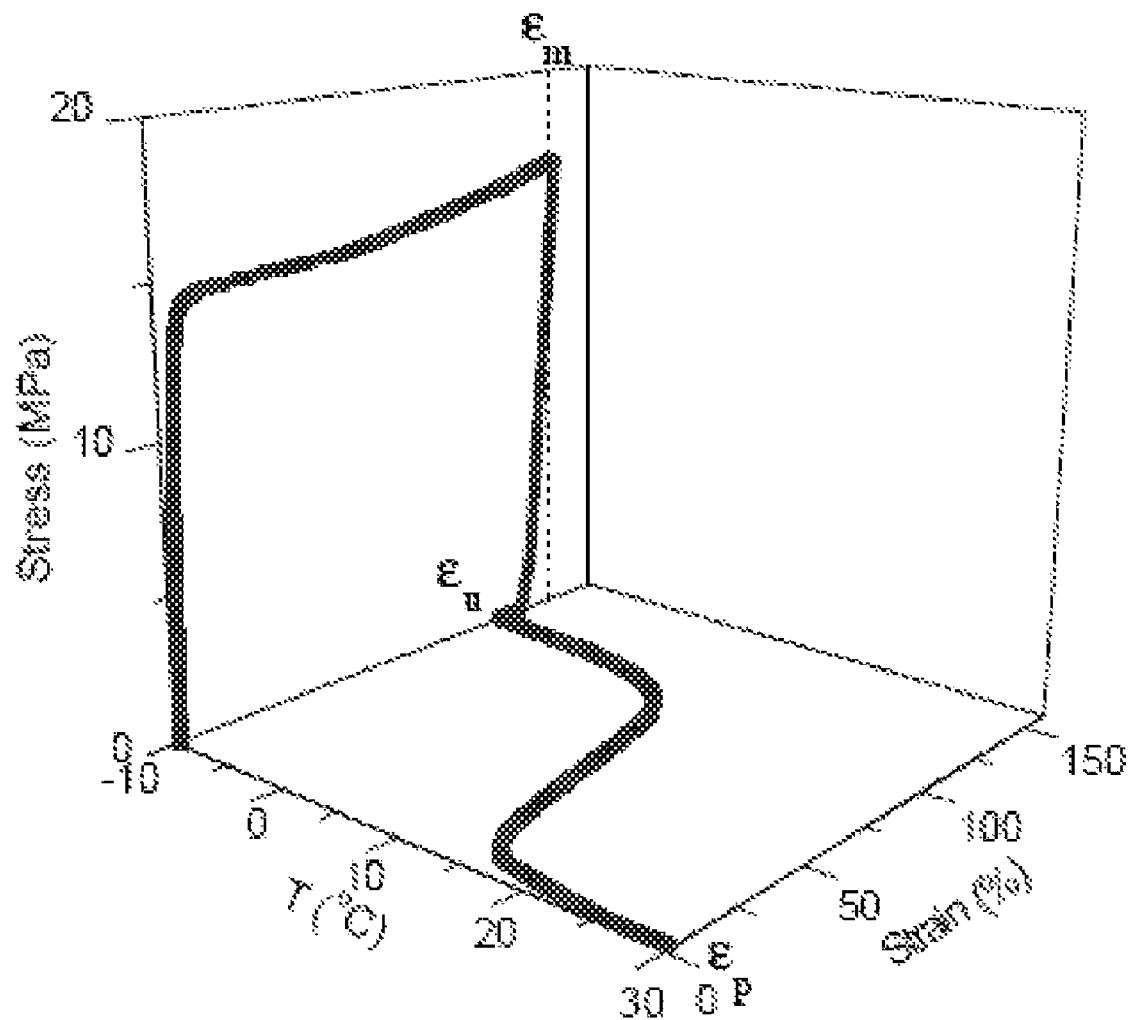
FIG. 17 shows the stress curves as a function of temperature and strain of polymer 1a in cold drawing mode.
Figure 18:
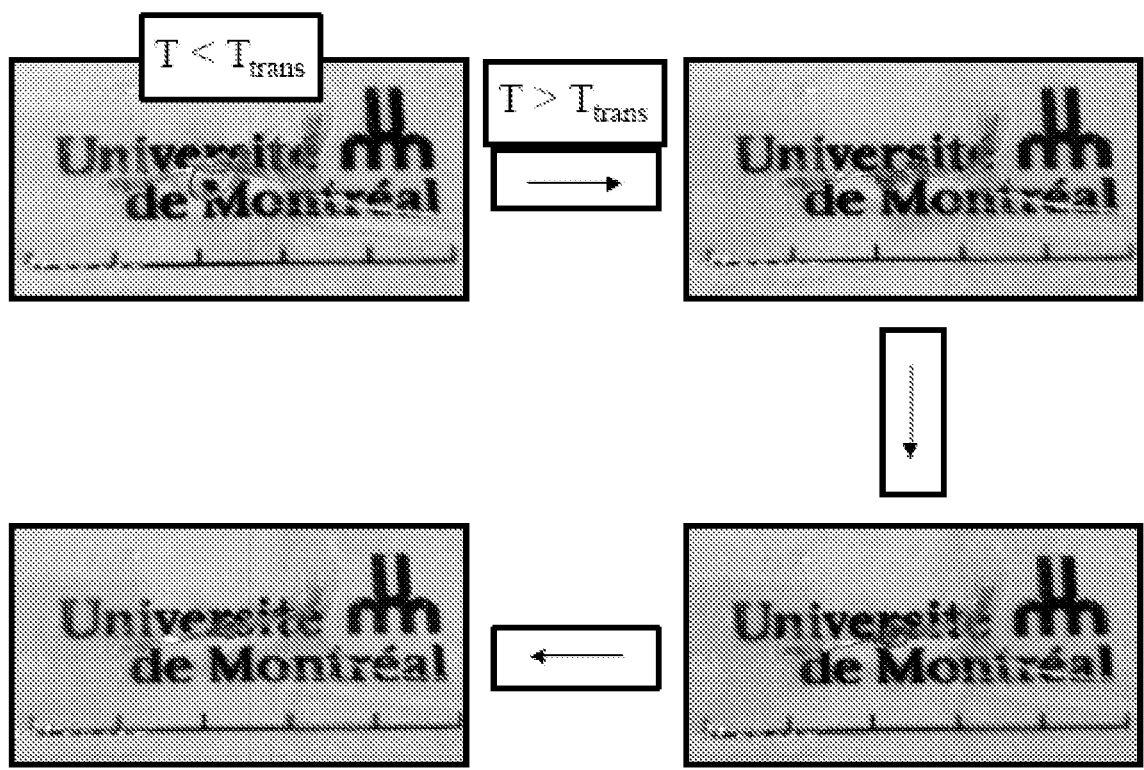
FIG. 18 shows pictures of the shape memory effect of polymer 1e in cold drawing mode.

FIGS. 17 and 18 shows the shape memory effect of polymer 1a and 1e in cold drawing mode. From FIG. 17 (and another similar figure for polymer 1e), R$_r$ values of 95.7±0.9% and 95.8±0.6% and R$_f$ values of 80.4±2.7% and 79.7±1.1% were calculated for polymers 1a and 1e, respectively. These values again demonstrate the very good shape memory effect of these polymers in cold drawing mode.

FIG. 18 shows pictures of this shape memory effect. The temporary shape of the polymer (1e) was an untied knot while its original shape was a tied knot. As can be seen, the polymer fully recovered its original shape (the knot tied itself) upon heating above its transition temperature.

Cold drawing mode shape memory has not been reported in the literature for degradable materials so far. This constitutes a major advantage over other existing degradable shape memory materials, since it decreases the number of programming steps.

Elasticity

Polymers based on bile acids, such as 1a-e and 10a-d, display rubber like elasticity above their glass transition temperature (T$_g$).

This elasticity behaviour (and therefore the ability of these materials to act as soft tissue engineering materials or shape memory materials) does not rely on a copolymer structure, with the presence of a hard block playing the role of cross-linker. Also, these materials do not require covalent cross-links to display elasticity or shape memory effects, but rather relies on the entanglement of the polymer chains in the material. This is an advantage in terms of control over degradation behaviour and overall performance upon degradation.

Low Young Modulus Near Body Temperature

The above materials have low Young moduli matching (or at least close to) those of many soft tissues such as the aorta, elastic cartilage and skin, which is advantageous for applications in soft tissue engineering.

Materials are Thermoplastics and Amorphous.

Polymers based on bile acids, such as 1a-e and 10a-d, are thermoplastics, which is a great advantage for processing these materials. In fact, these materials are amorphous and thermoplastics, which allows easier processability and better control of the degradation, whilst preserving critical mechanical properties.

Slow Heterogeneous Degradation

The amorphous character of the above materials is also an advantage in terms of degradation (more heterogeneous profile and good retention of the mechanical properties with time).

Degradability and Toxicity

Polymers 1a-e and 10a-d are degradable materials. In some cases, including biomedical applications, this is very useful.

The use of bile acids, which are naturally occurring compounds present in large amounts in the human body, as rigid cores ensures a low toxicity of the degradation products upon hydrolysis of the materials.

Example 5

The following polymers containing a dimer of a bile acid, i.e. cholic acid, were synthesized.

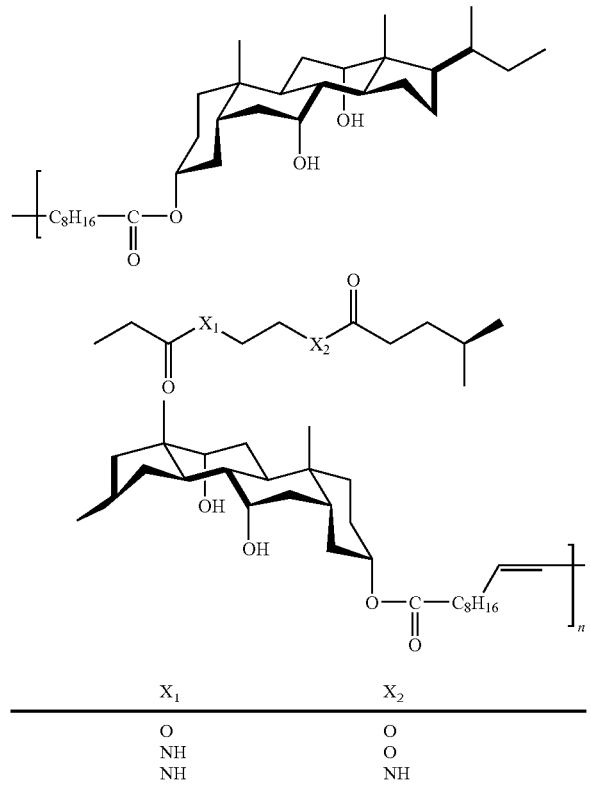

| $X_1$ | $X_2$ |
|---|---|
| O | O |
| NH | O |
| NH | NH |

These polymers were synthesized from cyclic monomers based on two molecules of bile acid (cholic acid) by the use of a second generation Grubbs' catalyst at room temperature.

Figure 19:
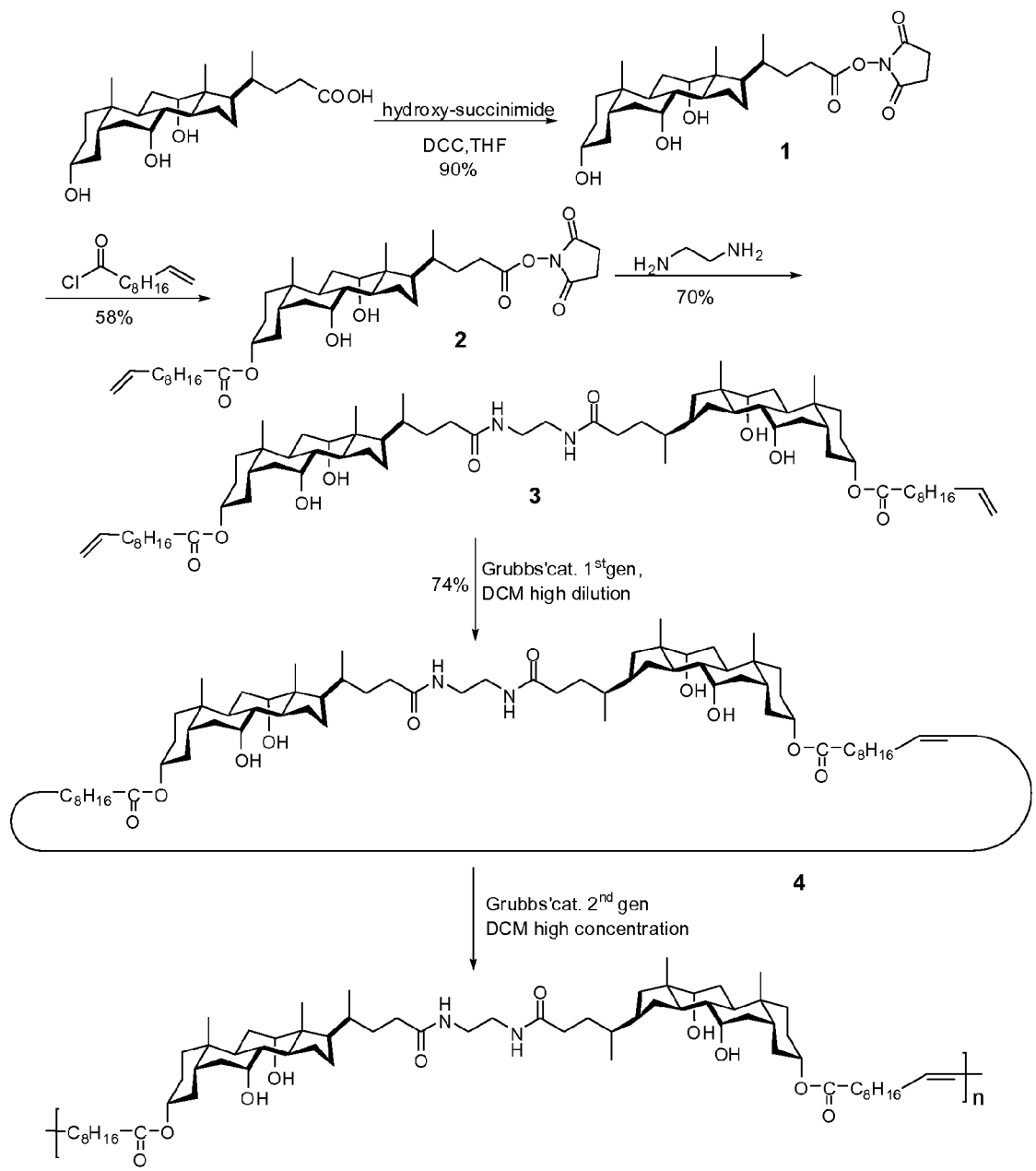
FIG. 19 shows the synthesis of the polymers of Example 5.

The synthetic procedure of a typical cyclic monomer based on ethylenediamine was as follows. After esterification and transesterification reaction, diene monomer was successfully synthesized by reacting an activated ester with ethylenediamine. The polymers were obtained through ED-ROMP by the use of a first generation Grubbs' catalyst. The reaction scheme is illustrated in FIG. 19. More specifically, the synthesis was as follows.

Compound 1: To a solution of cholic acid (7.36 g, 18 mmol) in dry THF (72 ml) and dry acetonitrile (18 ml), N-hydroxysuccinimide (2.22 g, 18.3 mmol) was added. To the resulting homogeneous solution, dicyclohexylcarbodiimide (3.72 g, 18 mmol) in dry THF (36 ml) was added dropwise at 10-15° C. The mixture was stirred at 25° C. for 18 h and the N,N-dicyclohexyl urea precipitate was removed by filtration. THF was removed under reduced pressure and the residue was extracted with ethyl acetate (3×50 ml) and the extract was washed successively with aqueous $NaHCO_3$, water and then with brine. The extract was dried over $Na_2SO_4$ and ethyl acetate was removed under reduced pressure to obtain a crude solid, which was crystallized from ethyl acetate/hexane (1, 8.2 g, 90%).

Compound 2: Compound 1 (2.0 g, 3.96 mmol), DCM (anhydrous, 18 mL) and triethylamine (freshly distilled, 0.83 mL, 5.96 mmol) were placed in a flame-dried round-bottom flask (3-neck, 50 mL) fitted with a pressure equalizing dropping funnel, under nitrogen. The mixture was cooled down to 0° C. Undecenoyl chloride (1.27 ml, 5.94 mmol) in dry DCM (3 ml) was added via the dropping funnel over 30 minutes. Compound 1 was dissolved and a precipitate (triethylamonium chloride salt) was formed. The resulting mixture was stirred overnight at room temperature and poured into dilute aqueous hydrochloric acid (0.1 M, 50 mL). The organic phase was then extracted with brine (3×30 mL), dried with $Na_2SO_4$, filtered and the solvent evaporated. Chromatography (on silica gel, hexane/ethyl acetate=2/1) afforded the desired compound 2 (1.54 g, 58%).

Compound 3: N-succinimide ester 2 of cholic acid (2.0 g, 2.98 mmol) was dissolved in dry DCM (20 ml) and to this homogenous solution ethylenediamine (82 mg, 1.37 mmol) in dry DCM (1 ml) was added. The reaction mixture was stirred at 25° C. for 3 h and the mixture was poured into crushed ice. The organic phase was then extracted with brine (3×20 mL), dried with $Na_2SO_4$, filtered and the solvent evaporated off. Chromatography (silica gel, hexane/ethyl acetate=1/2) afforded the desired diene 3 (1.12 g, 70%). Elemental Anal. Found C, 73.18, H, 10.30; N, 2.29%. $C_{72}H_{120}N_2O_{10}$ requires C, 73.68, H, 10.30; N, 2.39%.

Compound 4: Diene 3 (1 g, 8.52×10$^{-4}$ mol) and DCM (anhydrous, 284 ml) were placed in a flame-dried round-bottom flask (3-neck, 500 ml) under argon atmosphere. The resulting mixture was heated to reflux with argon for 1 h and a solution of benzylidene-bis(tricyclohexylphosphine) dichlororuthenium (Grubbs' catalyst 1$^{st}$ generation) (35 mg, 4.25×10$^{-5}$ mol) in DCM (anhydrous, argon degassed, 5 mL) was added. Stirring at refluxing temperature was continued for 3 h and ethylvinylether (1 mL, excess) was added in order to quench the catalyst. After stirring for a further 8 h, the solvent was evaporated and the resulting dark brown solid was purified by chromatography (on silica gel, hexane/ethyl acetate=1/2) to afford the desired compound 4 (0.72 g, 74%). Elemental Anal. Found C, 72.41, H, 10.28; N, 2.48%. $C_{70}H_{116}N_2O_{10}$ requires C, 73.38, H, 10.20; N, 2.44%.

As they are richer in bile acids, these polymers are expected to have higher glass transition temperatures, have similar shape memory properties and be harder materials with higher modulus than the polymers described above.

Example 6

Some of the polymers of the invention were found to exhibit liquid crystalline properties. One example of such polymer is:

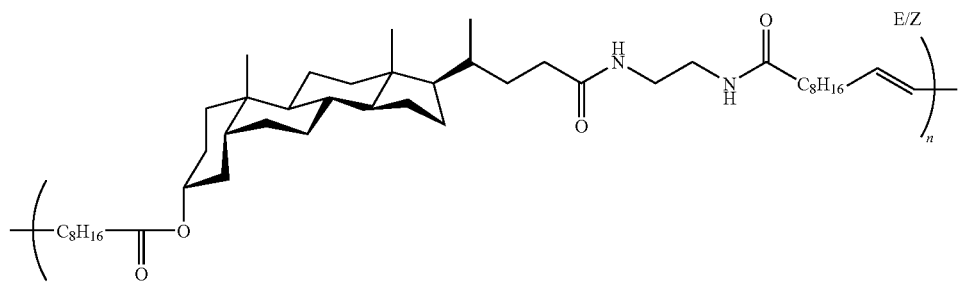

This polymer was dissolved by refluxing in THF and then the solution was cooled down to room temperature. The precipitated material was then collected by filtering the solution and drying the product in vacuum for 20 h. The sample, which contained a minute quantity of the solvent THF, was then examined by polarized optical microscopy, X-ray diffraction and differential scanning calorimetry (DSC).

Figure 20:
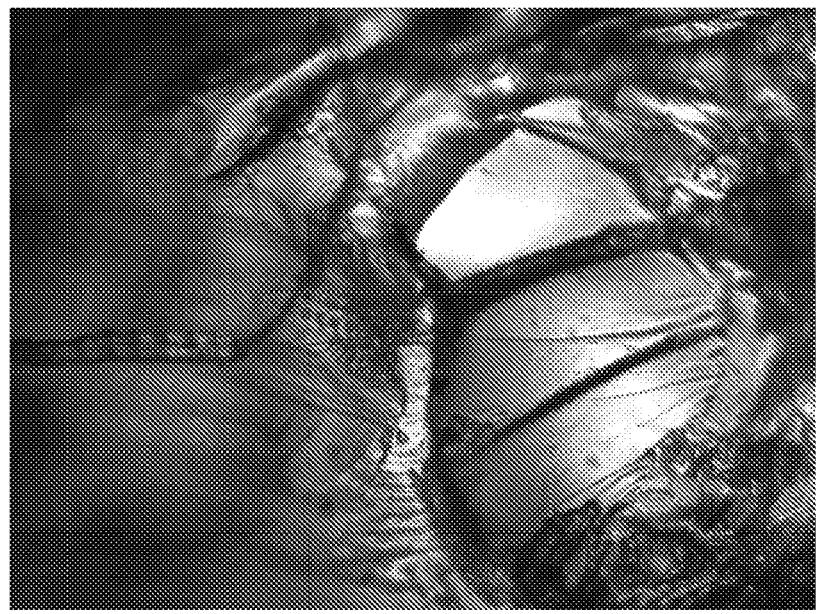
FIG. 20 shows a picture obtained by polarized optical microscopy of the polymer of Example 6 at room temperature.
Figure 21:
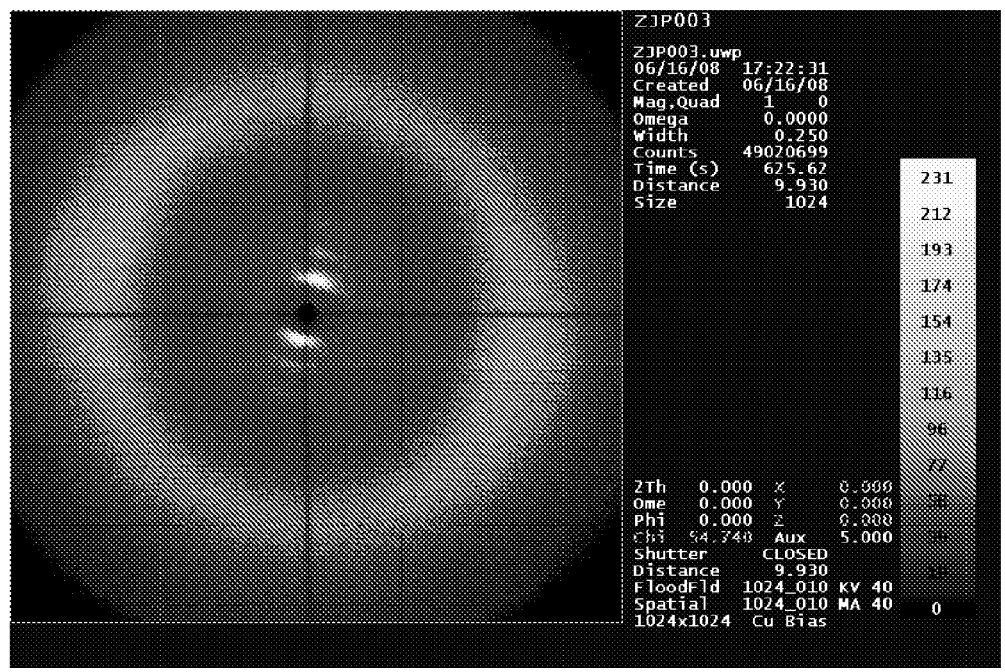
FIG. 21 shows the X-ray diffractogram of the polymer film of Example 6.
Figure 22:
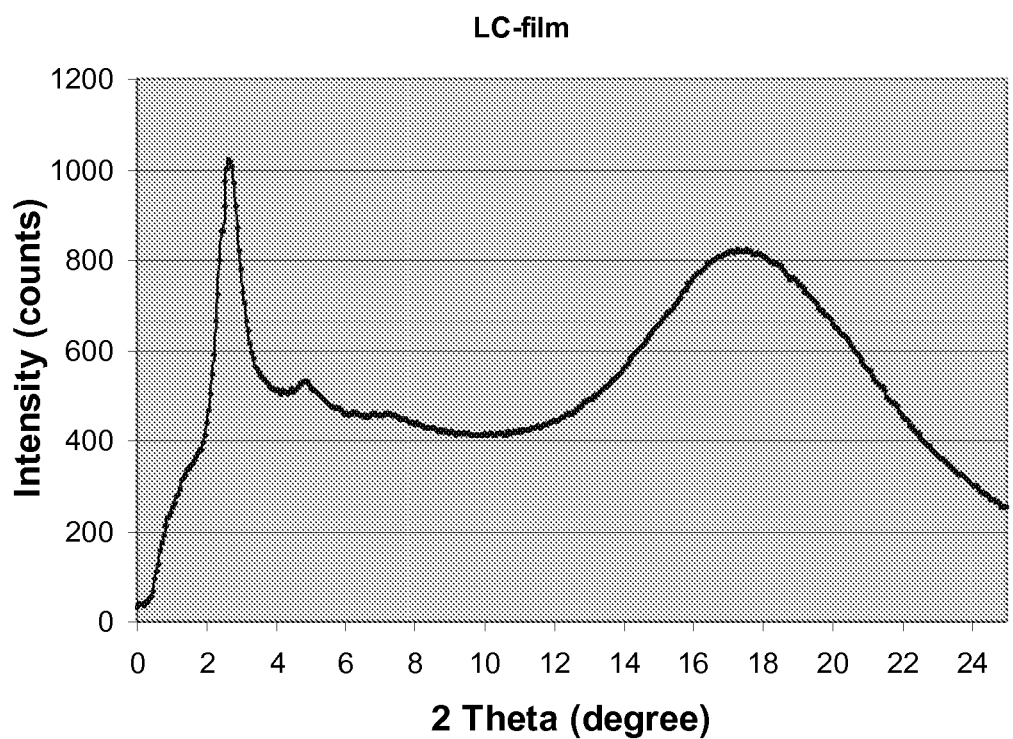
FIG. 22 shows the 2-theta curve obtained for the polymer of Example 6.

FIG. 20 shows a picture obtained by polarized optical microscopy of the polymer at room temperature. FIG. 21 shows the X-ray diffractogram of the polymer film and FIG. 22 shows the 2-theta curve obtained for this diffractogram. From this, it was determined that the polymer was in a liquid crystalline state.

Figure 23:
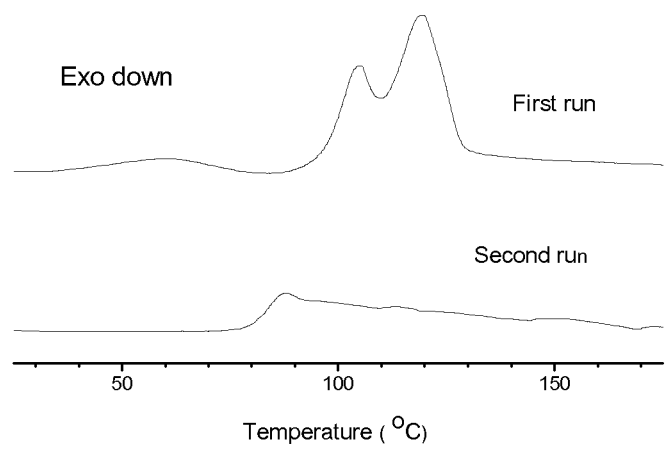
FIG. 23 shows the DSC curve obtained for the polymer of Example 6.

Finally, FIG. 23 shows the DSC curve obtained for this polymer. The glass transition temperature of the polymer as determined by DSC was $T_g$ (DSC)=84.1° C.

Although the present invention has been described hereinabove by way of specific embodiments thereof, it can be modified, without departing from the spirit and nature of the subject invention as defined in the appended claims.

The invention claimed is:

1. A polymer having a number average molecular weight (Mn) of about 10 000 or more g/mol and comprising a monomeric rigid moiety R and a monomeric flexible moiety F, wherein:
   R comprises a main-chain polycyclic core comprising a steroidal moiety, and
   F has a main chain comprising a number of atoms sufficient for the transition temperature of the polymer to be lower than the degradation temperature of the polymer,
   wherein said main chain of the flexible moiety F is an alkyl optionally comprising one or more ester, amide, urethane, urea, imide, imine, diazene, double bond, triple bond, ketone, sulfone, thioether, thioester, or fluoroalkane,
   and wherein said polymer is free from main-chain anhydride groups.

2. The polymer of claim 1 being a homopolymer, an alternating copolymer, a periodic copolymer, a random copolymer, a statistical copolymer or a block copolymer.

3. The polymer of claim 1 wherein the polycyclic core comprises at least four cycles.

4. The polymer of claim 3 wherein said cycles are aliphatic.

5. The polymer of claim 4 wherein said cycles are fused.

6. The polymer of claim 1 wherein said main chain of the flexible moiety F comprises at least 12 atoms.

7. The polymer of claim 6 wherein said main chain of the flexible moiety F is linear, branched, cyclic or a combination thereof.

8. The polymer of claim 7 herein said main chain of the flexible moiety F is acyclic.

9. The polymer of claim 6 wherein said main chain of the flexible moiety F comprises one or more ester, amide, urethane, urea, double bond, or triple bond.

10. The polymer of claim 6 wherein said main chain of the flexible moiety F is substituted by one or more of alkyl, aryl, fluoroalkyl, alkoxyl, hydroxyl, amine, nitrile, imine, ketone, aldehyde, carboxylic acid, carboxylate, ester, amide, imide, urethane, urea, anhydride, thiol, sulfonic acid, sulfonate, sulfonyle, bromide, chloride, iodide, azide, thioester, alkene, alkyne, ether, thioether, thioester, phosphoric acid, phosphorate or phosphine.

11. The polymer of claim 1 wherein R is of formula:

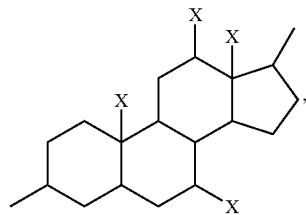

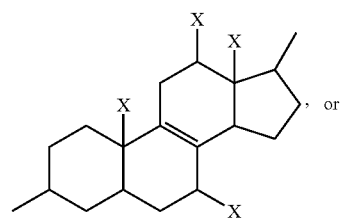

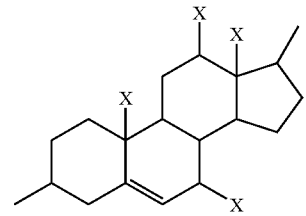

wherein X is the same or different and represents hydrogen, alkyl, aryl, fluoroalkyl, alkoxyl, hydroxyl, amine, nitrile, imine, ketone, aldehyde, carboxylic acid, carboxylate, ester, amide, imide, urethane, urea, anhydride, thiol, sulfonic acid, sulfonate, sulfonyle, bromide, chloride, iodide, azide, thioester, alkene, alkyne, ether, thioether, thioester, phosphoric acid, phosphorate or phosphine.

12. The polymer of claim 1 wherein R is a polycyclic core of a bile acid.

13. The polymer of claim 1 wherein R is of formula:

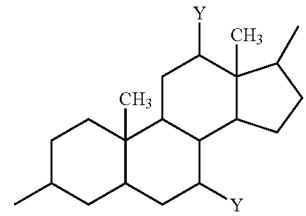

wherein Y is H or OH.

14. The polymer of claim 1 wherein R is a dimer of steroidal moieties.

15. The polymer of claim 14 wherein R is:

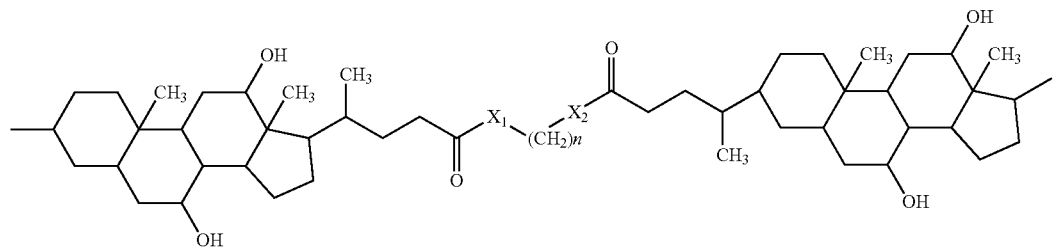

wherein $X_1$ and $X_2$ are independently O or NH and n is between 2 and 12.

16. The polymer of claim 6 wherein said main chain of the flexible moiety F comprises between about 26 and about 29 atoms.

17. The polymer of claim 6 wherein F is of formula:

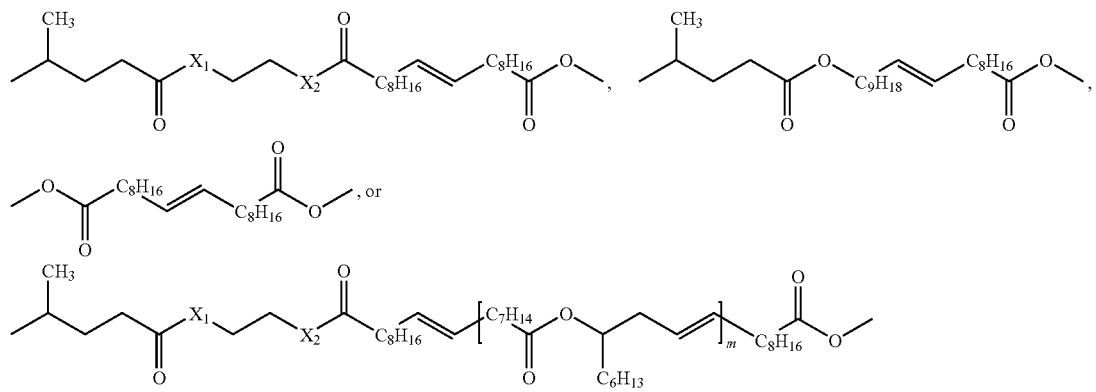

wherein $X_1$ and $X_2$ independently are O or NH and m is at least one.

18. The polymer of claim 1 having a glass transition ($T_g$) between about −75 and about 200° C.

19. The polymer of claim 1 having a glass transition ($T_g$) between about −25 and about 70° C.

20. The polymer of claim 1 having a number average molecular weight ($M_n$) of about 30 000 g/mol or more.

21. The polymer of claim 1 having a number average molecular weight ($M_n$) of about 100 000 g/mol or more.

22. A biomedical device comprising the polymer of claim 1.

23. The biomedical device of claim 22, wherein said device is a stent, a stent-graph, a suture, a scaffold or a support for tissue engineering, or a delivery device for the controlled release of an active ingredient.

24. The biomedical device of claim 23 wherein said delivery device is an implant, a patch, a liquid pharmaceutical composition or a solid pharmaceutical composition.

25. A device comprising the polymer of claim 1, wherein said device is a textile, a mould, a vehicle part, a tube, an active disassembly device, a microactuator, a toy or an inflatable membrane.

26. A method of manufacturing a polymer according to claim 1, said method comprising:

(a) providing:
  (i) a macrocycle comprising the steroidal moiety and another macrocycle comprising the monomeric flexible moiety,
  (ii) a macrocycle comprising the steroidal moiety and the monomeric flexible moiety, or
  (iii) a macrocycle comprising the steroidal moiety and at least part of the monomeric flexible moiety and another macrocycle comprising the remaining of the monomeric flexible moiety; and (b) polymerizing the macrocycles provided in (a) by ring-opening metathesis polymerization, thereby obtaining said polymer.

27. The method of claim 26 wherein said ring-opening metathesis polymerization is entropy-driven.

28. The method of claim 26 wherein said ring-opening metathesis polymerization is carried out with a coordination/insertion catalyst.

29. The method of claim 28 wherein said catalyst is a metathesis catalyst.

30. The method of claim 29 wherein said catalyst is a Grubbs' catalyst.

31. The method of claim 30 wherein said catalyst is:

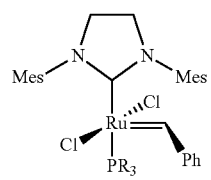

wherein R is cyclohexyl, phenyl or p-$CF_3C_6H_4$,

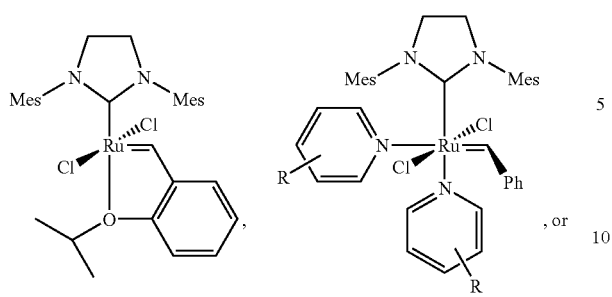, 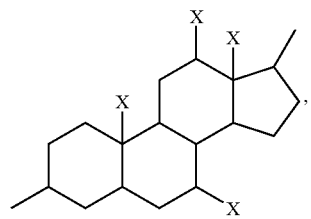, or

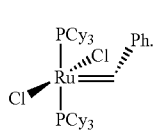

32. The method of claim 28 wherein said catalyst is tin octoate.

33. The method of claim 28 wherein said catalyst is an enzymatic catalyst.

34. The method of claim 33 wherein said catalyst is Novozyme.

35. The method of claim 26 wherein the steroidal moiety comprises at least four cycles.

36. The method of claim 35 wherein said cycles are fused.

37. The method of claim 26 wherein said main chain of the flexible moiety F comprises at least 12 atoms.

38. The method of claim 37 wherein said main chain of the flexible moiety F is linear, branched, cyclic or a combination thereof.

39. The method of claim 38 herein said main of the flexible moiety F chain is acyclic.

40. The method of claim 37 wherein said main chain of the flexible moiety F comprises one or more ester, amide, urethane, urea, double bond, or triple bond.

41. The method of claim 37 wherein said main chain of the flexible moiety F is substituted by one or more of alkyl, aryl, fluoroalkyl, alkoxyl, hydroxyl, amine, nitrile, imine, ketone, aldehyde, carboxylic acid, carboxylate, ester, amide, imide, urethane, urea, anhydride, thiol, sulfonic acid, sulfonate, sulfonyle, bromide, chloride, iodide, azide, thioester, alkene, alkyne, ether, thioether, thioester, phosphoric acid, phosphorate or phosphine.

42. The method of claim 26 wherein said steroidal moiety is of formula:

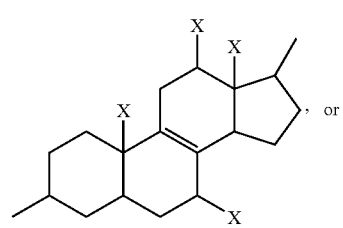, or

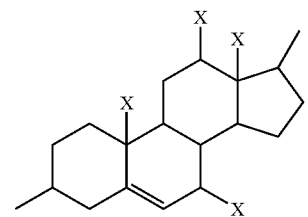

wherein X is the same or different and represents hydrogen, alkyl, aryl, fluoroalkyl, alkoxyl, hydroxyl, amine, nitrile, imine, ketone, aldehyde, carboxylic acid, carboxylate, ester, amide, imide, urethane, urea, anhydride, thiol, sulfonic acid, sulfonate, sulfonyle, bromide, chloride, iodide, azide, thioester, alkene, alkyne, ether, thioether, thioester, phosphoric acid, phosphorate or phosphine.

43. The method of claim 26 wherein said steroidal moiety is a polycyclic core of a bile acid.

44. The method of claim 26 wherein said macrocycle in (ii) is:

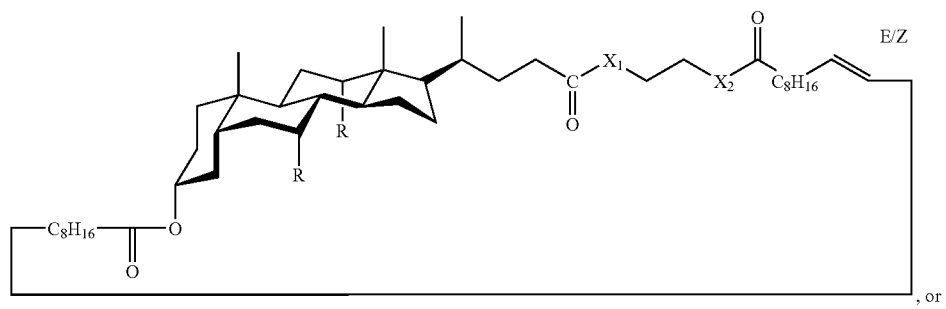, or

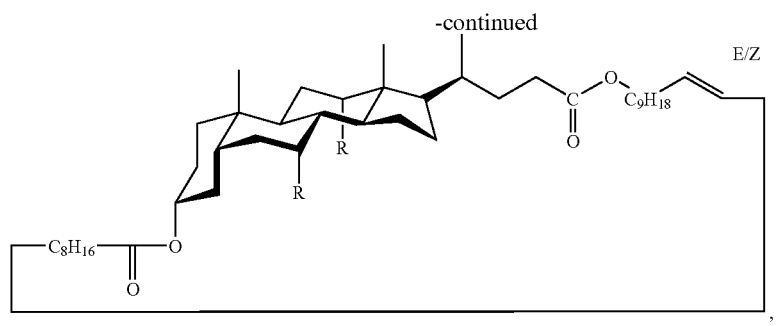
wherein R is independently H or OH and $X_1$ and $X_2$ are independently O or NH.
45. The method of claim 26 wherein said macrocycles in (iii) are:
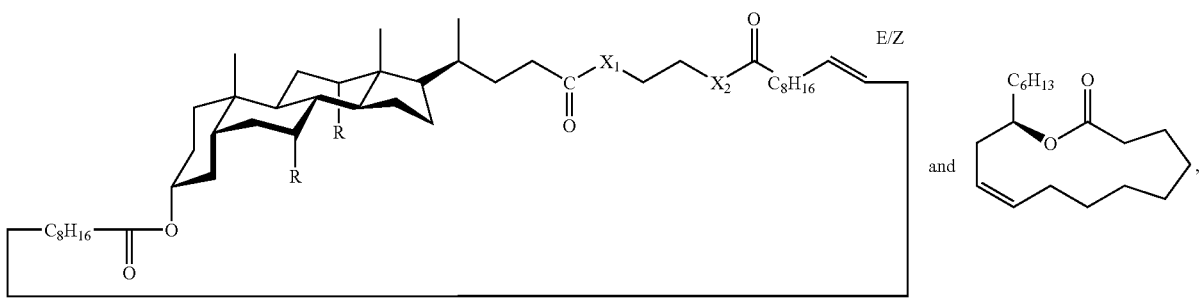
or OH and $X_1$ and $X_2$ are independently O or NH.
46. A polymer of formula:
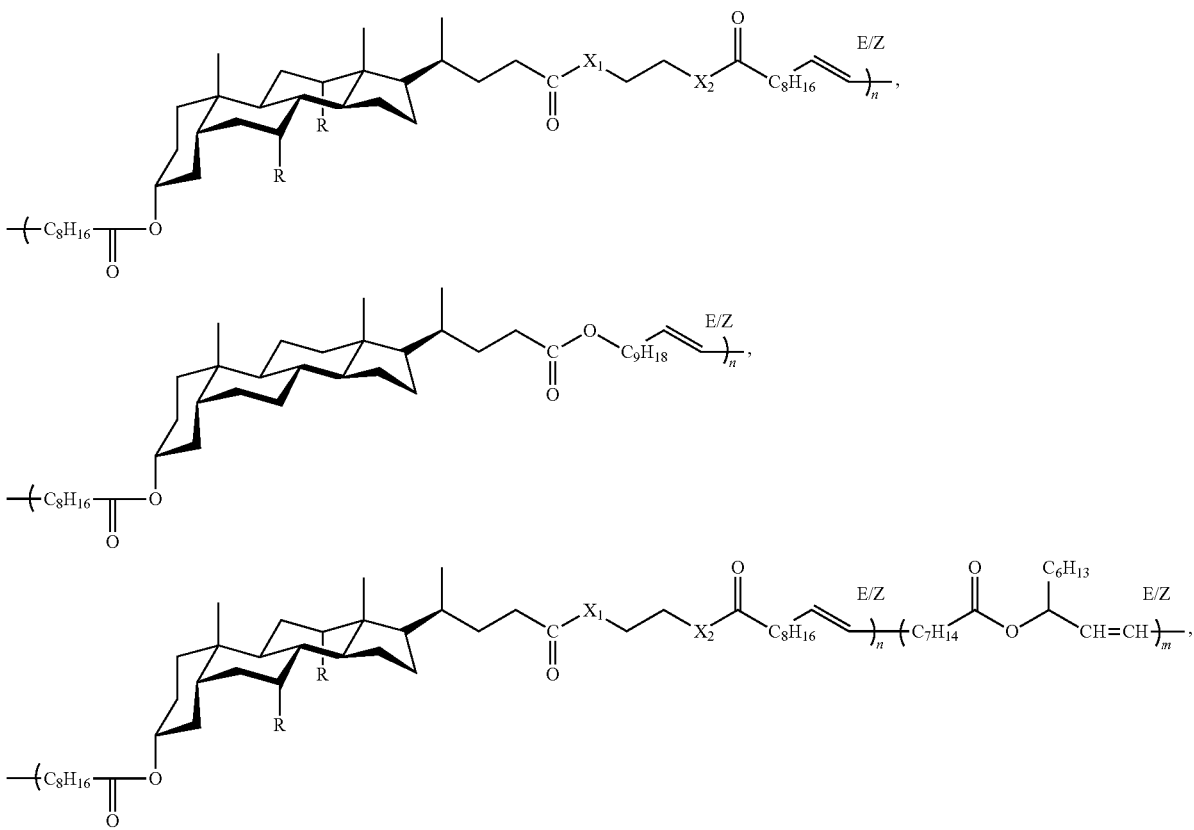

or
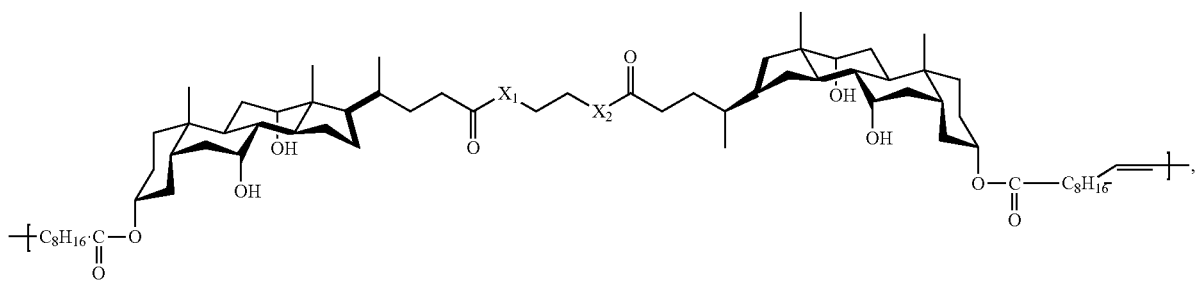
wherein n and m are number of repeating units,
R is —H or —OH, and
$X_1$ and $X_2$ are independently selected from —O— and —NH—.
* * * * *